(12) United States Patent
Utsumi et al.

(10) Patent No.: US 9,484,792 B2
(45) Date of Patent: Nov. 1, 2016

(54) ROTOR AND METHOD FOR MANUFACTURING THE ROTOR

(75) Inventors: Akihiro Utsumi, Kosai (JP);
Yoshinobu Nagao, Kosai (JP); Hiroshi Katou, Toyokawa (JP)

(73) Assignee: ASMO CO., LTD., Shizuoka-ken (JP)

( * ) Notice: Subject to any disclaimer, the term of this patent is extended or adjusted under 35 U.S.C. 154(b) by 380 days.

(21) Appl. No.: 13/533,587

(22) Filed: Jun. 26, 2012

(65) Prior Publication Data

US 2013/0002082 A1  Jan. 3, 2013

(30) Foreign Application Priority Data

Jun. 30, 2011 (JP) ................. 2011-146701
May 22, 2012 (JP) ................. 2012-116609

(51) Int. Cl.
*H02K 1/27* (2006.01)
*H02K 15/03* (2006.01)

(52) U.S. Cl.
CPC .............. *H02K 15/03* (2013.01); *H02K 1/276* (2013.01); *Y10T 29/49012* (2015.01)

(58) Field of Classification Search
CPC .... H02K 1/276; H02K 15/03; H02K 1/2766; H02K 1/2773
USPC ......... 310/156.53, 156.56, 216.009, 216.048
See application file for complete search history.

(56) References Cited

U.S. PATENT DOCUMENTS

| | | | |
|---|---|---|---|
| 6,133,662 A | 10/2000 | Matsunobu et al. | |
| 2005/0162029 A1* | 7/2005 | Tajima et al. | 310/156.53 |
| 2007/0103024 A1* | 5/2007 | Nakayama et al. | 310/156.53 |
| 2009/0230803 A1* | 9/2009 | Nakayama et al. | 310/156.56 |
| 2010/0141074 A1* | 6/2010 | Podack | 310/156.08 |
| 2010/0219714 A1* | 9/2010 | Abe | H02K 1/146 |
| | | | 310/216.048 |

FOREIGN PATENT DOCUMENTS

| | | | | |
|---|---|---|---|---|
| JP | H05-56583 | A | 3/1993 | |
| JP | 07322538 | A * | 12/1995 | |
| JP | H08-88963 | A | 4/1996 | |
| JP | 09191590 | A * | 7/1997 | ...... H02K 1/27 |
| JP | 09233748 | A * | 9/1997 | ...... H02K 1/27 |
| JP | 2000-184638 | | 6/2000 | |
| JP | 2001157395 | A * | 6/2001 | ...... H02K 1/27 |
| JP | 2001258187 | A * | 9/2001 | ...... H02K 1/27 |
| JP | 2004-289904 | A | 10/2004 | |
| JP | 2008029184 | A * | 2/2008 | |
| JP | 2008236862 | A * | 10/2008 | |
| JP | 2012050331 | A * | 3/2012 | |
| WO | WO 2005043741 | A2 * | 5/2005 | |

OTHER PUBLICATIONS

Ota et al., JP2001157395 Machine Translation, Jun. 2001.*
Noma et al., Machine Translation of JP09191590, Jul. 1997.*
Nigo et al., Machine Translation of JP2012050331,Mar. 2012.*
Futami et al.,Machine Translation of JP07322538, Dec. 1995.*
Chinese Office Action of CN 201210236011.0 dated Nov. 4, 2015 with its English Translation.

* cited by examiner

*Primary Examiner* — Quyen Leung
*Assistant Examiner* — Eric Johnson
(74) *Attorney, Agent, or Firm* — Christensen Fonder P.A.

(57) ABSTRACT

A rotor has a rotor core arranged to radially face a stator. The rotor core has an accommodation hole extending axially from an axial end face of the rotor core. A magnet is received in the accommodation hole. A recess, which is dented in a direction separating from the magnet, is formed in an end surface of the accommodation hole. The recess has an opening facing the magnet. A pair of open distal portions are arranged at opposite sides of the opening and pressed against the magnet.

11 Claims, 14 Drawing Sheets

ROTOR AND METHOD FOR MANUFACTURING THE ROTOR

BACKGROUND OF THE INVENTION

The present invention relates to a rotor and a method for manufacturing the rotor.

Conventionally, an IPM type rotor having magnets received in accommodation holes, which are formed in a rotor core, is broadly known.

A rotor described in Japanese Laid-Open Patent Publication No. 2000-184638 includes accommodation holes for receiving magnets and circular holes, each of which is formed in the vicinity of the corresponding one of the accommodation holes. A plastically deformable thin portion is formed between each accommodation hole and the corresponding circular hole. Accordingly, by passing a substantially columnar pin through each circular hole, the associated thin portion is plastically deformed to cause the magnet in the accommodation hole to be pressed against the corresponding wall of the accommodation hole. This maintains the magnet in the accommodation hole.

However, in the magnet fixing method for the rotor described in Japanese Laid-Open Patent Publication No. 2000-184638, if the amount of plastic deformation of the thin portion toward the magnet is excessively increased by a dimension error in the magnet or the rotor core, the thin portion may apply excessive pressure to the magnet and damage the magnet, which is fragile.

SUMMARY OF THE INVENTION

Accordingly, it is an objective of the present invention to provide a rotor capable of preventing damage to a magnet and maintaining the magnet in an accommodation hole, and a method for manufacturing the rotor.

To achieve the foregoing objective and in accordance with one aspect of the present invention, a rotor that includes a rotor core arranged to radially face a stator is provided. The rotor core has an accommodation hole extending axially from an axial end face of the rotor core. A magnet is received in the accommodation hole. A recess dented in a direction separating from the magnet is formed in a wall surface of the accommodation hole. The recess has an opening that faces the magnet, a pair of open distal portions arranged at opposite ends of the opening being pressed against the magnet.

In accordance with another aspect of the present invention, a method for manufacturing a rotor having a rotor core arranged to radially face a stator is provided. The rotor core has an accommodation hole extending axially from an axial end face of the rotor core. A magnet is received in the accommodation hole. The method includes: a step for forming a recess dented in a direction separating from the magnet in an end surface of the accommodation hole, the recess has an opening facing the magnet; and a step for deforming the recess without blocking the space between a pair of open distal portions arranged at opposite ends of the opening, thereby pressing the open distal portions against the magnet accommodated in the accommodation hole.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIG. 27A is a view illustrating punching in the second embodiment; and

FIGS. 27B and 27C are views each illustrating punching according to a modification.

DESCRIPTION OF THE PREFERRED EMBODIMENTS

First Embodiment

A first embodiment of the present invention will now be described with reference to the attached drawings.

Figure 1:
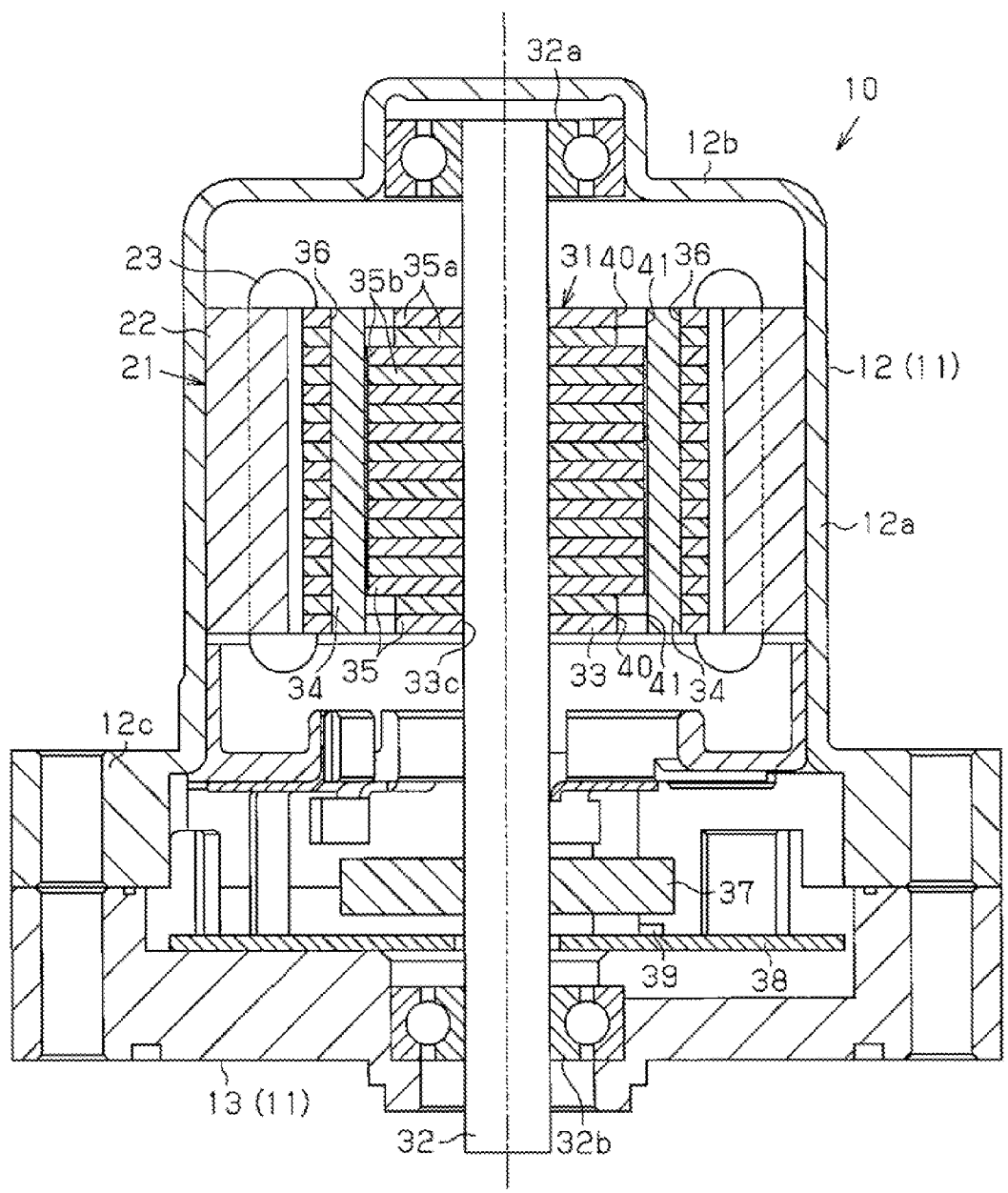
FIG. 1 is a cross-sectional view showing a motor according to a first embodiment of the present invention.

As shown in FIG. 1, a motor case 11 for a motor 10 of the first embodiment is configured by a substantially cylindrical case body 12 having a bottom portion and an opening and a substantially disk-like cover plate 13, which closes the opening of the case body 12.

The case body 12 has a cylindrical tubular portion 12a, a closing portion 12b for closing a first axial end (the upper end as viewed in FIG. 1) of the tubular portion 12a, and an annular flange portion 12c extending radially outward from a second axial end of the tubular portion 12a. The tubular portion 12a, the closing portion 12b, and the flange portion 12c are formed integrally with one another. The case body 12 of the first embodiment is formed by pressing a metal plate made of a magnetic body. By fixing the cover plate 13 to the flange portion 12c, the opening of the case body 12 is closed by the cover plate 13.

A cylindrical stator 21 is fixed to the inner peripheral surface of the tubular portion 12a. The stator 21 includes a cylindrical stator core 22 and coils 23 mounted in the stator core 22.

Figure 2:
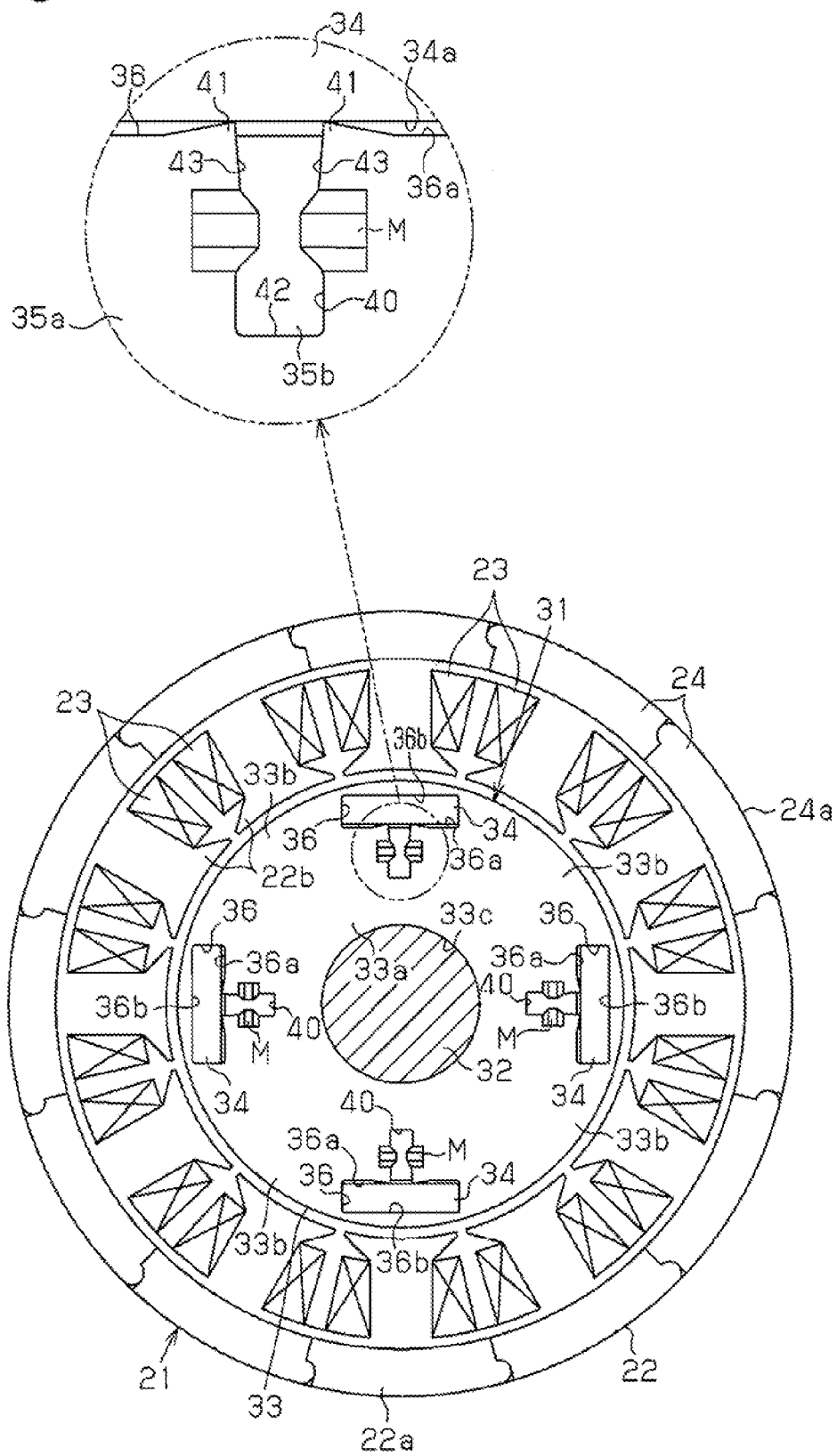
FIG. 2 is a plan view showing the rotor and the stator illustrated in FIG. 1.

With reference to FIGS. 1 and 2, the stator core 22 includes a cylindrical stator fixing portion 22a fixed to the tubular portion 12a and a plurality of teeth 22b extending radially inward from the stator fixing portion 22a. The coils 23 are wound around the corresponding teeth 22b. The stator core 22 is configured by a plurality of (in the first embodiment, twelve) split core pieces 24, which are arranged in a circumferential direction and each include the associated one of the teeth 22b.

As shown in FIG. 2, each of the split core pieces 24 has a fixing section 24a, which has an arcuate shape as viewed axially, and the corresponding one of the teeth 22b extending radially inward from the inner peripheral surface of the fixing section 24a. In each split core piece 24, the tooth 22b extends radially inward from a circumferentially middle portion of the fixing section 24a. As viewed axially, each split core piece 24 has a substantial T shape. The axial dimension of each fixing section 24a is equal to the axial dimension of each tooth 22b.

The split core pieces 24 are joined together such that the distal ends of the teeth 22b face radially inward and such that the fixing sections 24a collectively form the cylindrical stator fixing portion 22a, thus configuring the stator core 22.

A rotor 31 is arranged inside of the stator 21. The rotor 31 is configured by a columnar rotary shaft 32, a rotor core 33 fixed to the rotary shaft 32 in a manner rotatable integrally with the rotary shaft 32, and a plurality of (in the first embodiment, four) magnets 34 held by the rotor core 33.

The rotary shaft 32 is formed by, preferably, a non-magnetic body such as a stainless steel body to prevent leakage of magnetic flux. The upper end of the rotary shaft 32 as viewed in FIG. 1 is a proximal end of the rotary shaft 32, which corresponds to a counter-output side, and the lower end of the rotary shaft 32 is a distal end of the rotary shaft 32, which corresponds to an output side. The proximal end of the rotary shaft 32 is supported by a bearing 32a, which is formed in a radially middle portion of the closing portion 12b. The distal end of the rotary shaft 32 is supported by a bearing 32b, which is arranged in a radially middle portion of the cover plate 13. The rotary shaft 32 is arranged coaxially with and inside of the stator core 22. The distal end of the rotary shaft 32 extends through the radially middle portion of the cover plate 13 to project to the exterior of the motor case 11. The distal end of the rotary shaft 32 is thus exposed to the exterior of the motor case 11 to form an output shaft.

Referring to FIGS. 1 and 2, the rotor core 33 is formed by laminating a plurality of core sheets 35, each of which is punched out from a metal plate formed by a magnetic body through pressing. The rotor core 33 has a tubular fixing portion 33a and four pseudo magnetic poles 33b, which are formed integrally with the fixing portion 33a and arranged around the fixing portion 33a.

A fixing hole 33c is formed in a radially middle portion of the fixing portion 33a and extends through the fixing portion 33a in the axial direction of the rotary shaft 32. The inner diameter of the fixing hole 33c is slightly smaller than the outer diameter of the rotary shaft 32.

Through holes 36 (accommodation holes), which extend axially through the rotor core 33, are each formed between the corresponding adjacent pair of the pseudo magnetic poles 33b at the outer peripheral surface of the fixing portion 33a. The through holes 36 extend axially through the core sheets 35 and each have a substantially rectangular shape as viewed axially. In other words, each of the through holes 36 extends axially from one axial end face of the rotor core 33 to the other axial end face. Each of the through holes 36 receives the corresponding one of the magnets 34. Each magnet 34 is shaped like a rectangular parallelepiped that is elongated in the axial direction of the rotor core 33.

Figure 3A:
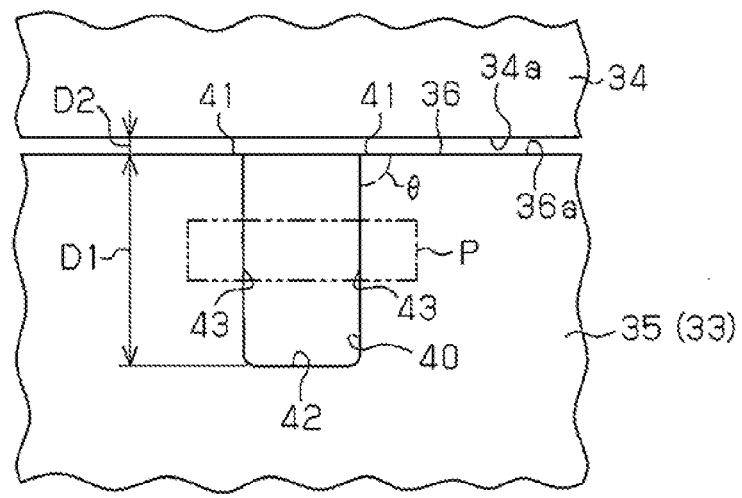
FIG. 3A is an enlarged partial view of the rotor, illustrating a method for manufacturing the rotor of FIG. 2.
Figure 3B:
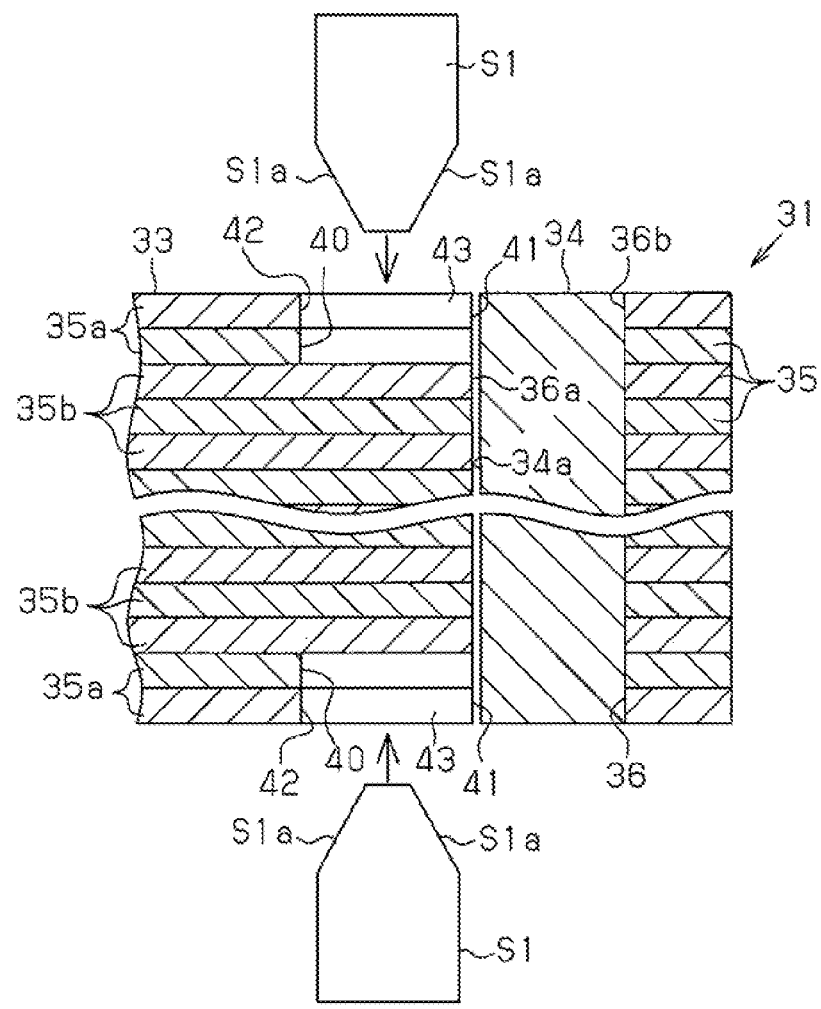
FIG. 3B is a cross-sectional view illustrating the method for manufacturing the rotor of FIG. 2.
Figure 4:
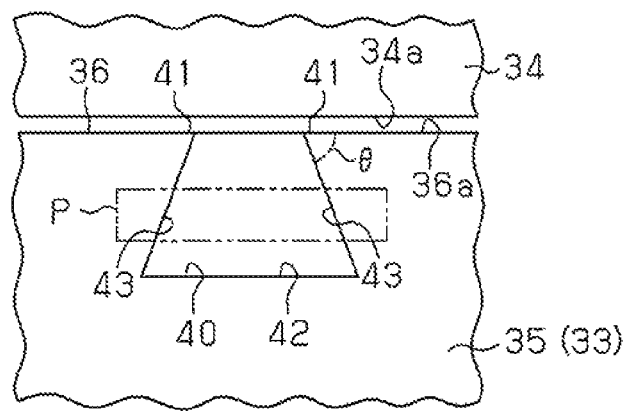
FIGS. 4 to 12 are enlarged partial views each showing a rotor according to a modification.

A recess 40, which is dented radially inward, is formed at each of the opposite axial ends of each through hole 36. Specifically, as illustrated in FIGS. 1 and 3B, the core sheets 35 are configured by two sets of first core sheets 35a (a total of four first core sheets 35a) and second core sheets 35b (those of the core sheets 35 other than the first core sheets 35a). The core sheets 35a are arranged at the opposite ends in the laminating direction (the axial direction). The second core sheets 35b are located between the opposite sets of the first core sheets 35a. The recesses 40 are formed in the four first core sheets 35a each as a cutout extending from the corresponding through hole 36. The recesses 40 are not formed in the second core sheets 35b and the through holes 36 extend simply in a rectangular shape at positions corresponding to the second core sheets 35b.

As shown in FIG. 2, a radially inner wall surface 36a (a wall surface) of each through hole 36 is substantially parallel to an inner surface 34a of the corresponding magnet 34 and radially faces the inner surface 34a with a slight clearance formed between the radially inner wall surface 36a and the inner surface 34a. Each recess 40 is formed in a circumferentially middle portion of the radially inner wall surface 36a. The recess 40 is dented inward (in the direction separating from the magnet) from the radially inner wall surface 36a of the through hole 36. Specifically, a radially outer end of the recess 40 (the end of the recess 40 close to the magnet 34) has a radial opening that faces the magnet 34. The opposite ends of the opening are a pair of open distal portions 41. A radially inner end of the recess 40, which is opposite to the radially outer end, is a closed end 42. The recess 40 has a substantially rectangular shape and includes a pair of circumferential end walls 43, which extend continuously from and substantially orthogonal to the radially inner wall surface 36a of the corresponding through hole 36.

The open distal portions 41 of each recess 40 are plastically deformed radially outward by performing staking (swaging) on those of the core sheets 35 located at the opposite axial ends. The open distal portions 41 are thus pressed radially outward against the magnet 34. This presses the magnet 34 against the radially outer wall surface 36b (the wall surface) of the through hole 36, thus maintaining the magnet 34 in the through hole 36. Specifically, as illustrated in FIG. 1, each magnet 34 is fixed to the open distal portions 41 of the corresponding recess 40 at the opposite axial ends of the magnet 34. The aforementioned staking is performed at a radially middle portion in each recess 40 by applying a staking jig S1 (see FIG. 3B) from the opposite axial ends of the rotor core 33. As a result, a staking mark M (see FIG. 2) is formed in the radially middle portion of the recess 40. In FIG. 1, the staking marks M are not illustrated for illustrative purposes.

In the first embodiment, each magnet 34 held in the corresponding through hole 36 is magnetized such that the radially outer end of the magnet 34 becomes a north pole and the radially inner end becomes a south pole. Accordingly, in the rotor 31 of the first embodiment, four magnets 34 corresponding to the north poles, not the south poles, are arranged circumferentially with respect to the rotor core 33. By arranging the magnets 34 in the corresponding through holes 36, the pseudo magnetic poles 33b are formed between the corresponding circumferentially adjacent pairs of the magnets 34. As a result, the magnets 34 of the north poles and the pseudo magnetic poles 33b are arranged alternately in a circumferential direction. Since the magnets 34 are arranged in this manner with respect to the rotor core 33 having the pseudo magnetic poles 33b, the pseudo magnetic poles 33b each function as a south pole in a pseudo manner. In other words, the rotor 31 of the first embodiment is a consequent pole type rotor having the magnets 34. Each magnet 34 has a first magnetic pole and a pseudo magnetic pole 33b, which functions as a second magnetic pole. The first magnetic poles and the second magnetic poles are arranged in a circumferentially alternating manner.

As illustrated in FIG. 1, the rotary shaft 32 has an annular sensor magnet 37, which is arranged axially between the distal surface (the lower surface as viewed in FIG. 1) of the rotary shaft 32 and the rotor core 33 and fixed to the rotary shaft 32 in an integrally rotatable manner. The sensor magnet 37 has a plurality of magnetic poles, which are magnetized such that north poles and south poles are arranged in a circumferentially alternating manner.

A circuit board 38 is fixed to an inner surface of the cover plate 13. Non-illustrated circuit elements for controlling the motor 10 are mounted on the circuit board 38. A Hall sensor 39 is arranged on the circuit board 38 to axially face the sensor magnet 37. The Hall sensor 39 is a Hall IC having a Hall element. The circuit board 38 is electrically connected to a non-illustrated drive control circuit, which is installed externally with respect to the motor 10.

An example of operation of the motor 10, which has the above-described configuration, will now be described. When electric power is supplied to the coils 23 of the motor 10, a rotating magnetic field is generated in the stator 21 and the rotor 31 rotates in correspondence with the rotating magnetic field. The Hall sensor 39 detects change in the magnetic field of the sensor magnet 37, which rotates integrally with the rotary shaft 32 of the rotor 31, and outputs a rotation detection signal to the drive control circuit as a pulse signal corresponding to the detected magnetic field. Based on the rotation detection signal, the drive control circuit detects rotation information about the rotor 31 (including the rotating speed and the rotating position). The drive control circuit controls the electric power supplied to the stator 21 using the detected rotation information of the rotor 31 such that the rotating speed of the rotor 31 becomes a desired rotating speed. As a result, the drive control circuit supplies electric power to the coils 23 in correspondence with the rotating state of the rotor 31.

[Method for Fixing Magnets]

A method for fixing (holding) the magnets 34 in the through holes 36 will hereafter be described.

The shape of each recess 40 before plastic deformation (staking) will first be described. As illustrated in FIG. 3A, the recess 40 has a rectangular shape as viewed axially before being plastically deformed. Specifically, the parallel circumferential end walls 43 of the recess 40 extend substantially orthogonal to the radially inner wall surface 36a of the corresponding through hole 36. In other words, the angle between each circumferential end wall 43 and the radially inner wall surface 36a is 90 degrees. The depth D1 of each recess 40 in the direction in which the corresponding magnet 34 contacts the open distal portions 41 (a radial direction) is greater than the clearance D2 between the radially inner wall surface 36a of the through hole 36 and the inner surface 34a of the magnet 34 in the aforementioned direction. The clearance D2 is a clearance formed in the state where the radially outer surface of the magnet 34 contacts the radially outer wall surface 36b of the through hole 36.

With reference to FIG. 3B, each magnet 34 is axially inserted (loosely) into the corresponding through hole 36 of the rotor core 33 and, in this state, staking (swaging) is performed on the rotor core 33 from its opposite axial ends using staking jigs S1 (pressing jigs). Specifically, the staking is carried out with a non-illustrated stopper member held in contact with the outer peripheral surface of the rotor core 33. Each of the staking jigs S1 has a tapered portion S1a, which presses and expands the corresponding portions of the core sheets 35 when the staking jigs S1 are pressed against the rotor core 33.

As illustrated in FIG. 3A, a staking spot P (a pressing zone) for each staking jig S1 is set to a radially middle portion of the corresponding recess 40. The staking width (the leftward-rightward width as viewed in FIG. 3A) is greater than the width of each recess 40 (the dimension between the two associated circumferential end walls 43). In other words, the staking spot P is set as a zone extending beyond the two circumferential end walls 43 of each recess 40.

As the staking jigs S1 are axially pressed against the rotor core 33 (the core sheets 35) at the staking spots P, each staking jig S1 expands the corresponding portions of the circumferential end walls 43 of the recess 40 in a radially outward direction to cause contact between the open distal portions 41 and the inner surface 34a of the magnet 34. As a result, each magnet 34 is clamped between the open distal portions 41 and the radially outer wall surface 36b of the corresponding through hole 36 and thus maintained in the through hole 36.

Operation of the first embodiment will hereafter be described.

Each recess 40 has an opening that faces the corresponding magnet 34 and the open distal portions 41 are formed at the opposite ends of the opening. In the above-described staking, the space between the open distal portions 41 is maintained in a non-blocked state and, in this state, the recess 40 is plastically deformed to cause contact between the open distal portions 41 and the magnet 34. Accordingly, if the amount of plastic deformation of each open distal portion 41 in a radially outward direction (a direction toward the corresponding magnet 34) is excessively increased by a dimension error of the magnet 34 or the through hole 36, the open distal portions 41, which contact the inner surface 34a of the magnet 34, escape into the recess 40. This prevents the force applied from the open distal portions 41 to the magnet 34 from becoming excessive. As a result, damage to the magnet 34 caused by staking is avoided.

Also, since the corresponding walls of each recess 40 are plastically deformed through staking, the open distal portions 41 are prevented from being displaced easily in the opposite direction to the direction in which the open distal portions 41 press the magnet 34 (a radially inward direction). In other words, the open distal portions 41 are prohibited from moving relative to the magnet 34 in a direction separating from the magnet 34. This stabilizes the holding force of each open distal portion 41, thus preventing axial movement of the magnet 34 caused through vibration of the rotor 31.

In the above-described staking, the staking jigs S1 are pressed against the core sheets 35 such that the tapered portion S1a of each staking jig S1 expands the corresponding portions of the core sheets 35. The portions of the core sheets 35 are thus expanded in shapes following the inclined shape of the tapered portion S1a. As a result, the staking jigs S1 are removed without being caught by the core sheets 35. This prevents the staking jigs S1 from being caught when being removed to cause deformation of the open distal portions 41 in an undesirable direction, which is, for example, a direction away from the magnet, and thus decrease the force for holding each magnet 34.

The first embodiment has the advantages described below.

(1) The recess 40 is formed in the corresponding wall of each through hole 36 (each accommodation hole), which accommodates the magnet 34, and dented from the inner wall surface (the radially inner wall surface 36*a*) of the through hole 36 in a direction separating from the magnet (in a radially inward direction). The recess 40 has an opening that faces the magnet 34 and the two open distal portions 41 are arranged at the opposite ends of the opening. By pressing the open distal portions 41 against the magnet 34, the magnet 34 is held in the through hole 36. When the open distal portions 41 are deformed to be pressed against the magnet 34, the open distal portions 41 are allowed to escape into the recess 40. Accordingly, even when the plastic deformation amount of each open distal portion 41 toward the magnet 34 becomes excessive due to dimension errors in the magnet 34 and the through hole 36, the pressure applied from the open distal portions 41 to the magnet 34 is prevented from becoming excessive. As a result, each magnet 34 is prevented from being damaged by pressing from the side corresponding to the rotor core 33 and maintained in the through hole 36.

(2) The depth D1 of each recess 40 in the direction in which the magnet 34 and each open distal portion 41 are pressed against each other (in a radial direction) is greater than the clearance D2 between the corresponding wall of each through hole 36 and the magnet 34 in the aforementioned direction. As a result, when the open distal portions 41 are pressed against the magnet 34, the open distal portions 41 are allowed to escape into the recess 40 further easily.

(3) Each recess 40 is defined by the two circumferential end walls 43 (end wall portions), which extend continuously from the radially inner wall surface 36*a* of the through hole 36 and oppose each other. The recess 40 is formed such that the angle θ between each circumferential end wall 43 and the radially inner wall surface 36*a* of the through hole 36 is 90 degrees. This allows each open distal portion 41 to easily escape into the recess 40 when the open distal portion 41 is pressed against the magnet 34. As a result, each magnet 34 is further reliably prevented from being damaged through pressing by the corresponding open distal portions 41.

(4) Since each open distal portion 41 is plastically deformed to be pressed against the corresponding magnet 34, the open distal portion 41 is prevented from being easily displaced in the opposite direction to the direction in which the open distal portion 41 presses the magnet 34 (in a radially inward direction). This stabilizes the holding force of each open distal portion 41, thus preventing the magnet 34 from being axially displaced when, for example, the rotor 31 vibrates.

(5) The inner walls of each through hole 36 include the radial end wall surfaces, which radially oppose each other. The corresponding recess 40 is formed in the radial end wall surface (the radially inner wall surface 36*a*) more spaced from the stator 21 than the other radial end wall surface. As a result, compared to a configuration in which each recess 40 is arranged in the radial end wall surface (the radially outer wall surface 36*b*) closer to the stator 21 than the other radial end wall surface, influence (magnetic flux leak) on effective magnetic flux (magnetic flux promoting rotation of the rotor 31) by the recess 40 is decreased. As a result, torque of the rotor 31 is prevented from decreasing.

(6) Each recess 40 is formed in the circumferentially middle portion of the radially inner wall surface 36*a*, thus causing magnetic flux of the corresponding magnet 34 to flow in a well-balanced manner at the opposite circumferential ends of the recess 40. This further decreases the influence on the effective magnetic flux by the recess 40, thus further reliably preventing the torque of the rotor 31 from decreasing.

(7) The rotor core 33 is formed by laminating the multiple core sheets 35. The through holes 36 extend in the laminating direction of the core sheets 35. The two sets of the core sheets 35, each of which includes a predetermined number of (in the first embodiment, two) core sheets 35, at the opposite ends in the laminating direction of the core sheets 35 (the axial direction) are the first core sheets 35*a*, in which each through hole 36 has the associated recess 40. Those of the core sheets 35*a* arranged between the sets of the first core sheets 35*a* are the second core sheets 35*b*, which are formed without the recesses 40. The open distal portions 41 of each recess 40, which is formed in the corresponding wall of the corresponding through hole 36 in the first core sheets 35*a*, fix the magnet 34. Since the second core sheets 35*b* do not have the recesses 40, magnetic resistance caused by the recesses 40, which are formed in the through holes 36, is decreased. As a result, the torque of the rotor 31 is prevented from dropping.

(8) By axially pressing the rotor core 33 in the zones each including a portion of the corresponding recess 40 as viewed axially using the staking jigs S1, the open distal portions 41 are pressed against the corresponding magnet 34. In other words, the pressing zone for each staking jig S1 (the staking spot P) includes a portion of the recess 40. This decreases the pressing force of the staking jig S1 necessary for plastically deforming the recess 40 to press the open distal portions 41 against the magnet 34. This makes it easy for the staking jigs S1 to plastically deform the recesses 40.

(9) The pressing zone for each staking jig S1 (the staking spot P) extends beyond the two circumferential end walls 43. The staking jig S1 is thus allowed to press the circumferential end walls 43 in a uniform manner. As a result, the open distal portions 41 (the ends of the circumferential end walls 43 closer to the magnet 34) have equal pressing force with respect to the magnet 34.

The first embodiment may be modified to the forms described below.

Although the angle θ between each circumferential end wall 43 and the radially inner wall surface 36*a* is 90 degrees in the first embodiment, the invention is not restricted to this. That is, for example, the angle θ between the circumferential end wall 43 and the radially inner wall surface 36*a* may be less than 90 degrees (an acute angle). As a result, when the open distal portions 41 are pressed against the corresponding magnet 34, the open distal portions 41 are allowed to escape into the recess 40 further reliably.

In the first embodiment, each staking spot P extends beyond the two circumferential end walls 43 of the recess 40. In other words, staking is performed on the circumferential end walls 43 using the staking jigs S1. However, the invention is not restricted to this. That is, staking may be carried out on only one of the circumferential end walls 43, for example.

Figure 5:
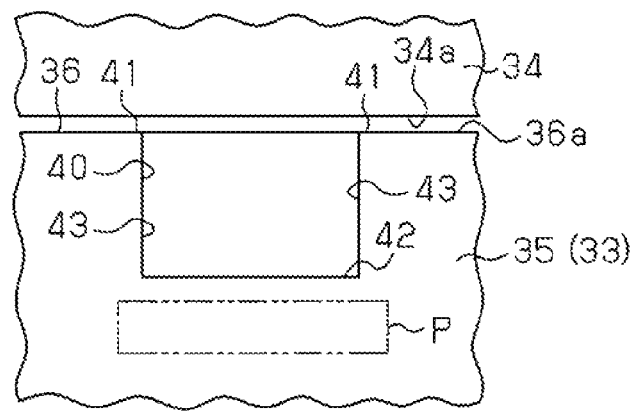

Further, as illustrated in FIG. 5, each staking spot P may be set at a position radially inward of the closed end 42 without including the recess 40. Even by this fixing (staking) method, the substantially same operation and advantages as the operation and advantages of the first embodiment are obtained. If staking is performed at a position radially inward of each closed end 42, as illustrated in FIG. 5, it is preferable to set the staking width (the leftward-rightward width as viewed in FIG. 5) to a value greater than the width of each recess 40 (the dimension between each pair of circumferential end walls 43). Further, for staking in the zone radially inward of each closed end 42, it is preferable to set the width of each recess 40 to a value greater than the width of the recess 40 for staking in the zone including the recess 40 (the zone between the closed end 42 and each open distal portion 41) as in the first embodiment.

Figure 6:
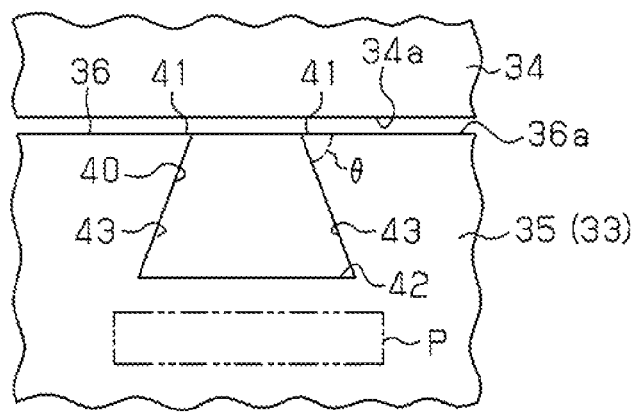
Figure 7:
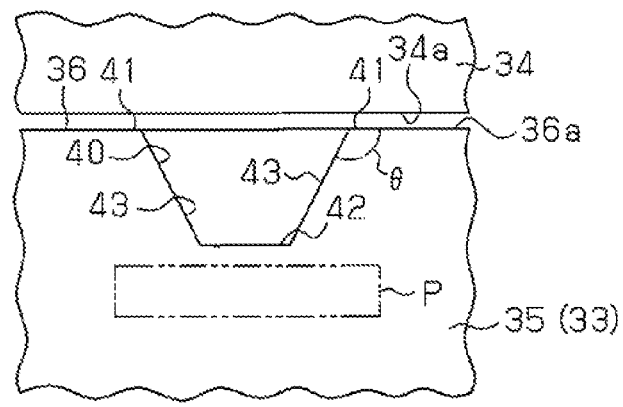

Alternatively, as illustrated in FIG. 6, the angle θ between each circumferential end wall 43 and the radially inner wall surface 36a may be set to a value less than 90 degrees. In this case, each staking spot P is set to a position radially inward of the closed end 42. Also, referring to FIG. 7, the angle θ between each circumferential end wall 43 and the radially inner wall surface 36a may be set to a value greater than 90 degrees. In this case, each staking spot P is set to a position radially inward of the closed end 42. Specifically, the staking spot P in the case where the angle θ between each circumferential end wall 43 and the radially inner wall surface 36a exceeds 90 degrees is not restricted to the form shown in FIG. 7. That is, the staking spot P in this case may be set to a zone including the recess 40 (a zone between the closed end 42 and each open distal portion 41).

Figure 8:
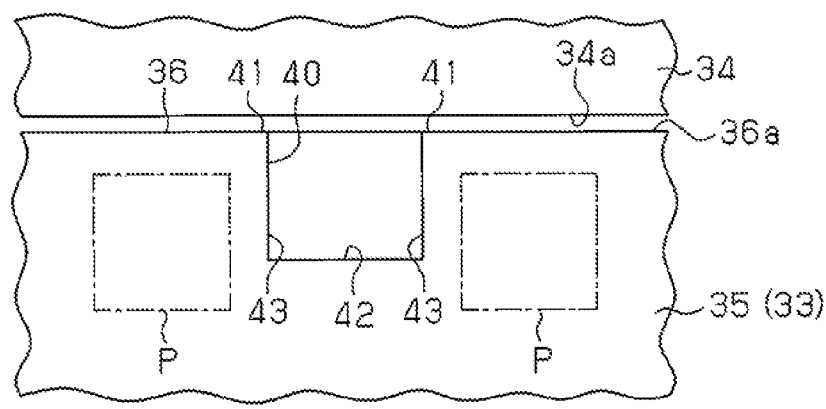

Further, as illustrated in FIG. 8, staking may be performed separately on the opposite circumferential ends of each recess 40. In this case, to increase the amount of plastic deformation of each open distal portion 41 in a radially outward direction, it is preferable to enlarge the size of each staking jig S1 in the direction of plastic deformation of the open distal portion 41 (a radial direction) compared to the size of each staking jig S1 of the first embodiment (see the up-down length of the staking spot P illustrated in FIG. 8). Also, by setting the staking spot P to a position closer to the radially inner wall surface 36a of the through hole 36 (the open distal portions 41), the amount of plastic deformation of each open distal portion 41 in the radially outward direction is effectively increased.

Figure 9:
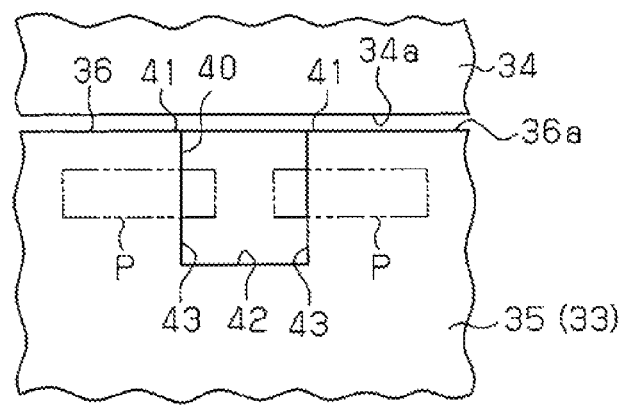

In the first embodiment, staking is performed on the two circumferential end walls 43 of each recess 40 using a single staking jig S1. However, the invention is not restricted to this. For example, as illustrated in FIG. 9, the two circumferential end walls 43 may be subjected to staking separately from each other.

Figure 10:
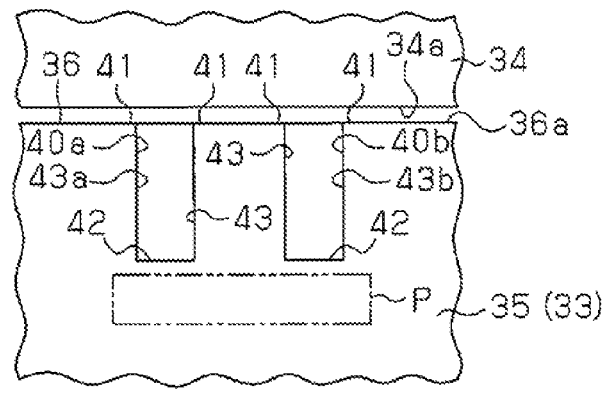
Figure 11:
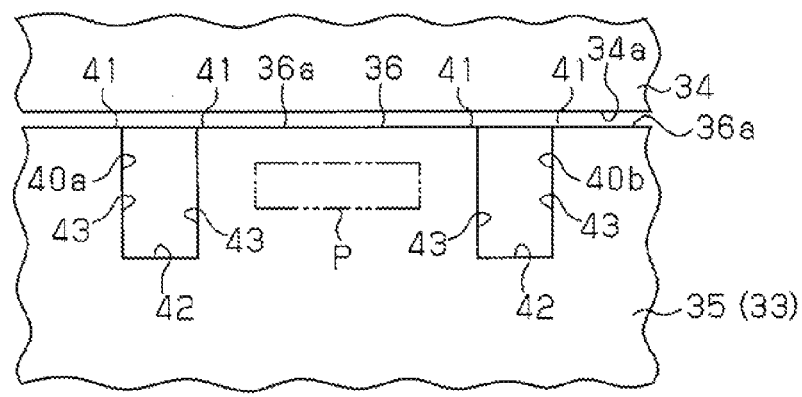

In the first embodiment, only one recess 40 is formed in the radially inner wall surface 36a of each through hole 36. However, the invention is not restricted to this. For example, referring to FIG. 10, two recesses, which are a first recess 40a and a second recess 40b, may be formed in the radially inner wall surface 36a. Specifically, in the form shown in FIG. 10, the staking spot P is set to a position radially inward of the closed end 42. The staking width is set to a width including the widths of the two recesses 40a, 40b, which is the dimension between one of a pair of circumferential end walls 43a of the first recess 40a spaced from the second recess compared to the other one and one of a pair of circumferential end walls 43b of the second recess 40b spaced from the first recess compared to the other one. By performing staking at the staking spot P, the open distal portions 41 of each recess 40 are pressed against the corresponding magnet 34. Specifically, the staking spot P is not restricted to the form shown in FIG. 10 but may be set at a position between the closed end 42 and the open distal portions 41. Alternatively, referring to FIG. 11, the staking spot P may be set at a position between the recesses 40a and 40b in a circumferential direction.

Figure 12:
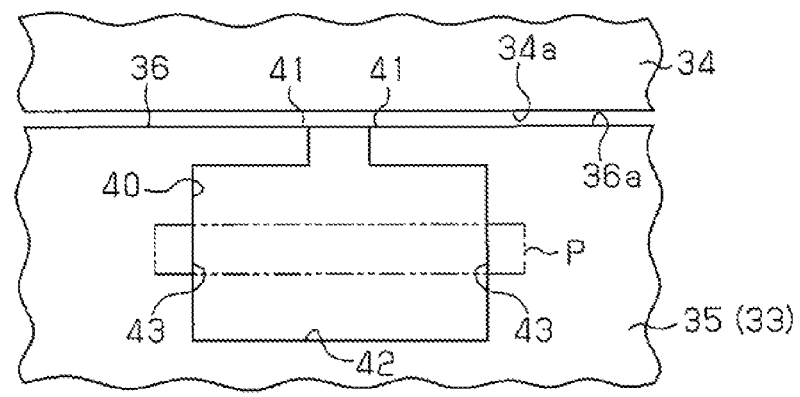

With reference to FIG. 12, the open distal portions 41 of each recess 40 may be extended circumferentially inward (in other words, in a direction in which the open distal portions 41 become closer to each other). Also in this configuration, the same operation and advantages as those of the first embodiment are obtained.

In the first embodiment, pressure is applied to the first core sheets 35a from the opposite axial sides using the staking jigs S1 to press the open distal portions 41 of each recess 40 against the corresponding magnet 34. However, the invention is not restricted to this. For example, with the space between the two open distal portions 41 maintained in a non-blocked state, a punch (a jig) may be inserted into each recess 40 to press the open distal portions 41 of the recess 40 against the magnet 34. After pressing the open distal portions 41, the punch is removed from the recess 40. Also by this method, the open distal portions 41 are pressed against the corresponding magnet 34. The method facilitates plastic deformation of those of the core sheets 35 located at inner axial positions with respect to the recesses 40, thus making it easy to further firmly fix each magnet 34 by increasing the number of the open distal portions 41, which are pressed against the magnet 34. Specifically, if this method is employed, it is preferable that the angle θ between each circumferential end wall 43 of every recess 40 and the radially inner wall surface 36a of the corresponding through hole 36 be set to a value less than 90 degrees to increase the amount of projection of each open distal portion 41 toward the magnet 34.

The space between the open distal portions 41 maintained in a non-blocked state by the punch refers to the circumferential space between the open distal portions 41 at least without the punch inserted in the space. However, it is further preferable to set the distance between the end of each punch closer to the magnet 34 and the radially inner wall surface 36a of the corresponding through hole 36 in the pressing direction of each open distal portion 41 (the radial direction) to a value greater than the clearance D2 between the inner surface 34a of the magnet 34 and the radially inner wall surface 36a of the through hole 36. This makes it easier for the open distal portions 41 to escape into the corresponding recesses 40.

In the first embodiment, the open distal portions 41 of the core sheets 35 at the opposite axial ends (the first core sheets 35a) are radially pressed against the corresponding magnets 34. However, the invention is not particularly restricted to this.

Figure 13A:
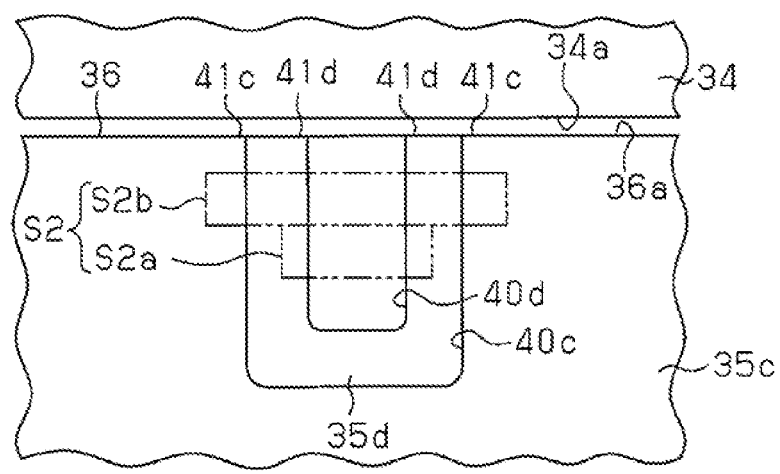
FIG. 13A is an enlarged partial view showing a rotor according to another modification.
Figure 14:
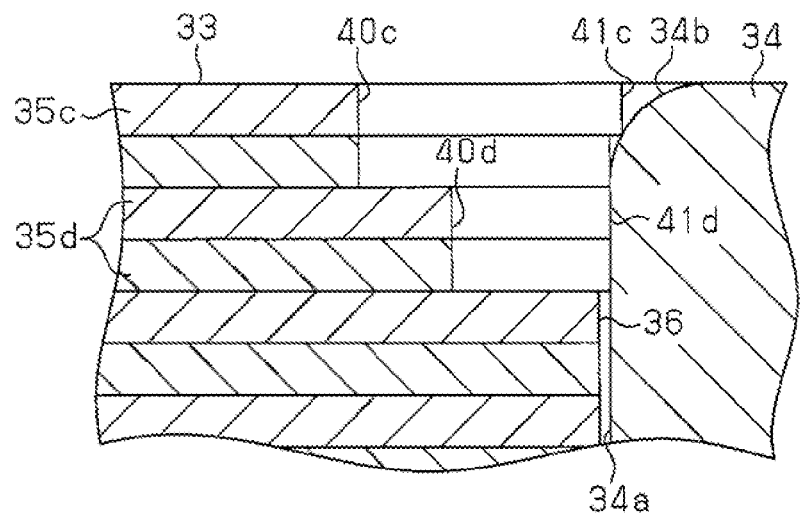
FIG. 14 is a cross-sectional view schematically showing a rotor according to another modification.

For example, in the forms shown in FIGS. 13A and 14, the radial length and the circumferential width of each of recesses 40c formed in the core sheets 35c at the axial opposite ends (the opposite ends in the laminating direction; only one end is shown in the drawings) are greater than the radial length and the circumferential width of each of recesses 40d formed in the core sheets 35d located at the inner axial positions (the inner positions in the laminating direction). As a result, each recess 40d, which is located at an inner axial position, is visible as a whole from the recess 40c formed at the corresponding axial end.

Figure 13B:
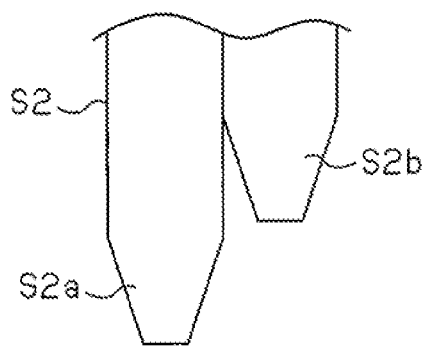
FIG. 13B is a view schematically showing the staking jig illustrated in FIG. 13A.

In the forms illustrated in FIGS. 13A and 14, staking is performed on the recesses 40c, 40d using a staking jig S2 (see FIG. 13B). The staking jig S2 has a first pressing portion S2a and a second pressing portion S2b, which are formed integrally with each other. The first pressing portion S2a plastically deforms the recess 40d, which is located at the inner axial position. The second pressing portion S2b plastically deforms the recess 40c, which is arranged at the corresponding axial end. The first pressing portion S2a and the second pressing portion S2b are formed in a stepped manner. The circumferential width (the leftward-rightward width as viewed in FIG. 13A) of the second pressing portion S2b is greater than the circumferential width of the first pressing portion S2a. As a result, the recesses 40c, 40b are both pressed through a single time of pressing on the rotor core 33 in the axial direction.

The first pressing portion S2a axially presses the recess 40d at the inner axial position through the recess 40c arranged at the axial end. In other words, the recess 40c at the axial end functions also as a jig insertion window for inserting the first pressing portion S2a. After the first pressing portion S2a presses and plastically deforms the recess 40d, which is at the inner axial position, open distal portions 41d of the recess 40d are projected toward the magnet 34 and pressed against the inner surface 34a of the magnet 34.

When the first pressing portion S2a contacts the recess 40d at the inner axial position, the second pressing portion S2b contacts the recess 40c at the axial end substantially simultaneously. After the second pressing portion S2b presses and plastically deforms the recess 40c at the axial end, open distal portions 41c of the recess 40c are projected into the through hole 36 and contact a round corner portion 34b (a corner portion formed by the inner surface 34a and the corresponding axial end face) of the magnet 34. The open distal portions 41c are thus axially held in contact with the magnet 34. Specifically, to increase the amount of projection of the second pressing portion S2b into the through hole 36, the pressing position for the second pressing portion S2b is set to a position closer to the magnet 34 than the pressing position for the first pressing portion S2a.

In this configuration, the open distal portions 41d of each recess 40d, which is located at the inner axial position, are pressed against an axially middle portion of the corresponding magnet 34. Accordingly, even if the magnet 34 is displaced axially, the open distal portions 41d are prevented from separating from the magnet 34. As a result, the magnet 34 is maintained in the corresponding through hole 36 with improved stability. Also, since the open distal portions 41c of each recess 40c, which is arranged at the corresponding axial end, axially contact the corresponding magnet 34, the open distal portions 41c reliably prevent the magnet 34 from displacing axially. Further, the first pressing portion S2a plastically deforms the recess 40d at the inner axial position through the recess 40c (the jig insertion window) at the corresponding axial end. This facilitates plastic deformation of the recess 40d at the inner axial position. Additionally, through a single time of pressing using the single staking jig S2, the open distal portions 41c at the opposite axial ends are projected into the through hole 36 and axially contact the magnet 34 and the open distal portions 41d at the inner axial position are pressed against the magnet 34. As a result, the rotor 31 is manufactured easily.

In the forms illustrated in FIGS. 13 and 14, the walls of the recesses 40c, 40d are plastically deformed through staking (swaging). However, other than this, the recess 40c, which is located at each axial end, may be plastically deformed by inserting a punch (a jig) into the recess 40c. In this case, the recess 40d at the inner axial position is plastically deformed through staking. Alternatively, in a reversed manner, the recess 40c at each axial end may be plastically deformed through staking and the recess 40d at the inner axial position may be plastically deformed by inserting a punch into the recess 40d. Further, the recesses 40c, 40d may be plastically deformed by passing a punch into the recesses 40c, 40d. In the forms shown in FIGS. 13 and 14, the open distal portions 41d at the opposite axial ends are pressed against the corner portions 34b of each magnet 34. However, the open distal portions 41d may be pressed against an axial end face of the magnet 34.

Figure 15:
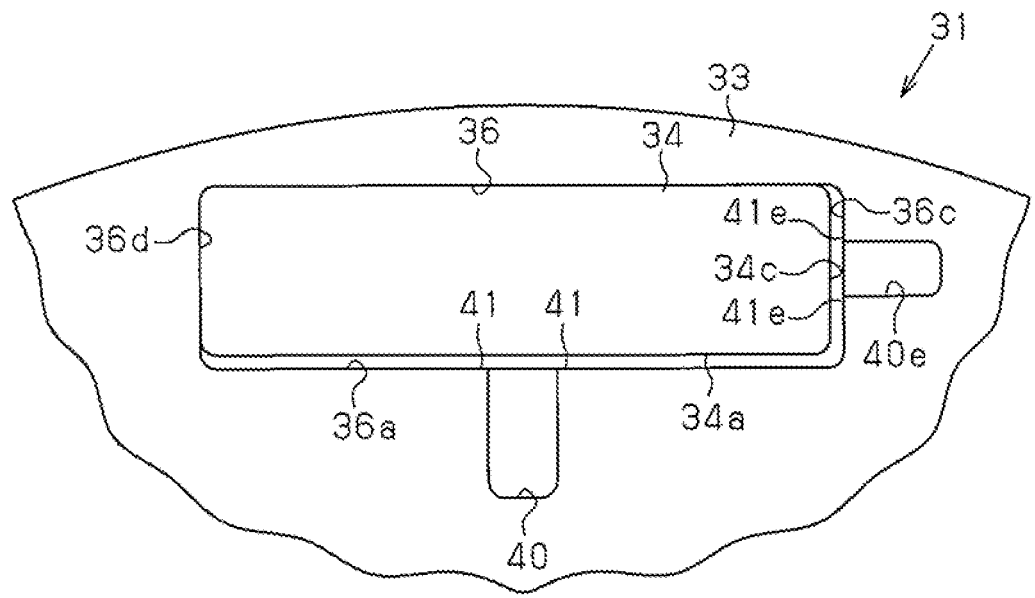
FIG. 15 is an enlarged partial view showing a rotor according to another modification.

In the first embodiment, each recess 40 is formed in the radially inner wall surface 36a of the corresponding through hole 36. However, the invention is not restricted to this. For example, as illustrated in FIG. 15, an additional recess 40e may be formed in a circumferential end wall surface 36c of each through hole 36. The recess 40e has open distal portions 41e, which are projected toward the corresponding magnet 34 through staking, for example, and pressed against a first circumferential end portion 34c (a circumferential end surface) of the magnet 34. Specifically, FIG. 15 shows a state before plastic deformation (a state before staking). In this configuration, the open distal portions 41, 41e fix the corresponding magnet 34 radially and circumferentially, thus maintaining the magnet 34 with increased firmness.

In the form shown in FIG. 15, each recess 40 and the associated recess 40e are formed in the radially inner wall surface 36a and the circumferential end wall surface 36c, respectively, of the corresponding through hole 36. However, the recess 40 in the radially inner wall surface 36a may be omitted and only the recess 40e in the circumferential end wall surface 36c may be formed. In the form of FIG. 15, although each recess 40e is formed in the circumferential end wall surface 36c, which is one of the two circumferential wall surfaces of the through hole 36, an additional recess 40e may be formed in a circumferential end wall surface 36d, which is the other circumferential wall surface of the through hole 36.

In the first embodiment, the rotor core 33 is configured by laminating the two pairs of the first core sheets 35a at the opposite axial ends and the multiple second core sheets 35b arranged at the inner axial positions. However, the invention is not restricted to this. For example, the number of the first core sheets 35a, each having the recesses 40, may be changed to any suitable value when necessary.

Figure 16:
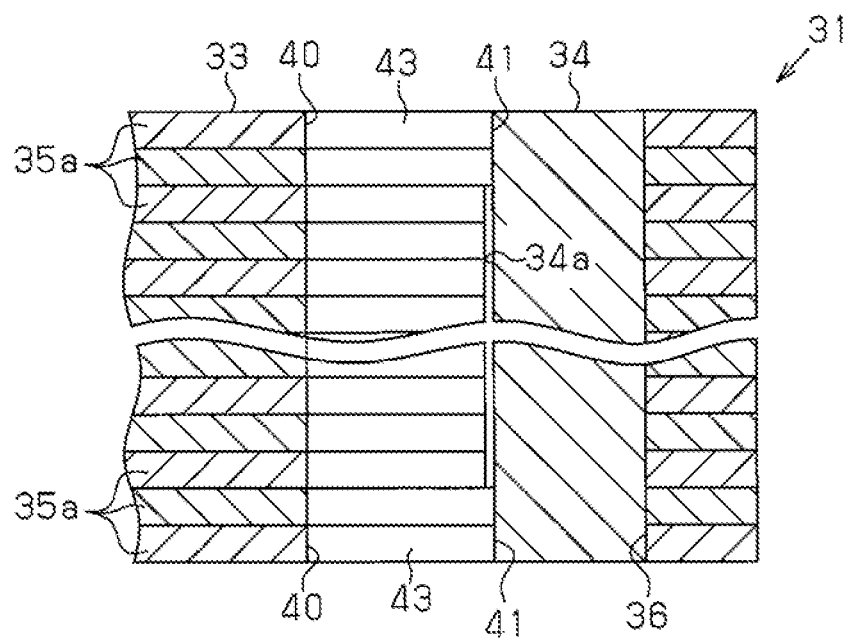
FIG. 16 is a cross-sectional view schematically showing a rotor according to another modification.

Alternatively, as illustrated in FIG. 16, the core sheets forming the rotor core 33 may all be the first core sheets 35a. In the form illustrated in FIG. 16, walls of the recesses 40 formed in the two pairs of the first core sheets 35a at the opposite axial ends are plastically deformed such that the open distal portions 41 of each recess 40 are pressed against the corresponding magnet 34. For the other ones of the first core sheets 35a (which are arranged at the inner axial positions), walls of the recesses 40 are not plastically deformed. That is, the open distal portions 41 of each recess 40 are not pressed against the corresponding magnet 34.

As has been described, by configuring the rotor core 33 using multiple core sheets (first core sheets 35a) having identical shapes, part management is facilitated and costs are saved compared to a case where the rotor core 33 is formed by multiple types of core sheets.

In the first embodiment, with each magnet 34 loosely received in the corresponding through hole 36, the open distal portions 41 of each recess 40 are pressed against the corresponding magnet 34 through staking, thus fixing the magnet 34 to walls of the through hole 36. However, the invention is not restricted particularly to this but the magnets 34 may be fixed in the corresponding through holes 36 by press-fitting the magnets 34 in the through holes 36.

Figure 17:
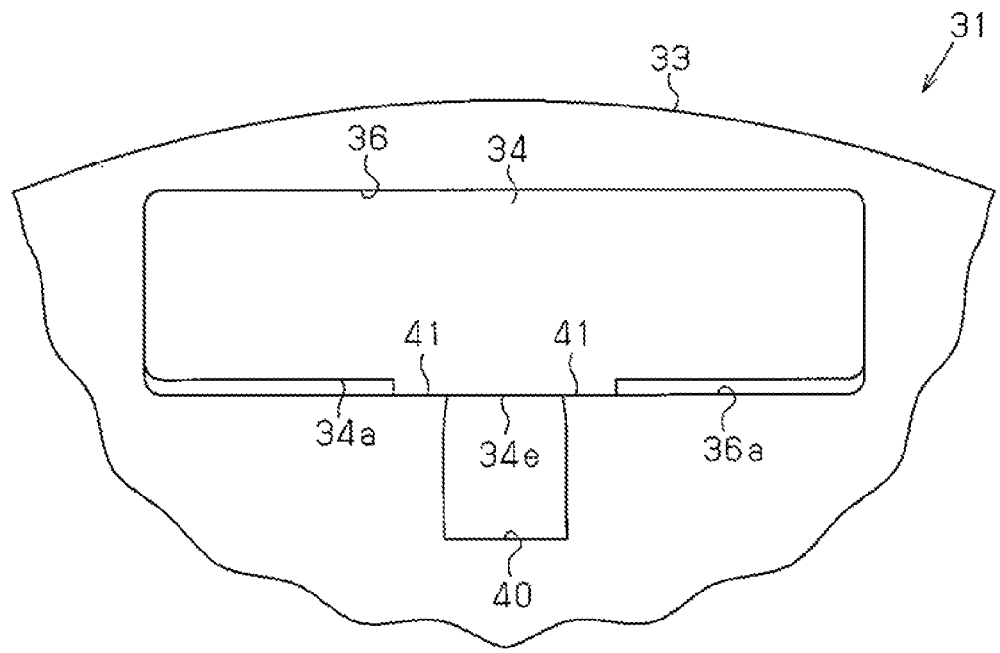
FIG. 17 is an enlarged partial view showing a rotor according to another modification.

For example, in the form illustrated in FIG. 17, a projection 34e, which projects radially inward (in the direction toward the radially inner wall surface 36a of the corresponding through hole 36), is projected from the inner surface 34a of each magnet 34. When the magnet 34 is press-fitted in the corresponding through hole 36, the projection 34e radially contacts the open distal portions 41 of the recess 40 to plastically deform the open distal portions 41 radially inward. As a result, each of the open distal portions 41 is plastically deformed and, in this state, pressed against the projection 34e, thus maintaining the magnet 34 in the through hole 36.

In this configuration, even if an excessive press-fit margin is generated by a dimension error, the open distal portions 41 are allowed to escape into the corresponding recesses 40. This prevents excessive increase of pressure applied from each open distal portion 41 to the corresponding magnet 34. As a result, damage to any of the magnets 34 caused by press fitting from the side corresponding to the rotor core 33 is avoided. Also, walls of the recesses 40 are plastically deformed and the open distal portions 41 are pressed against the corresponding magnets 34 simply by press-fitting the magnets 34 in the corresponding through holes 36. This simplifies the manufacture steps.

Figure 18:
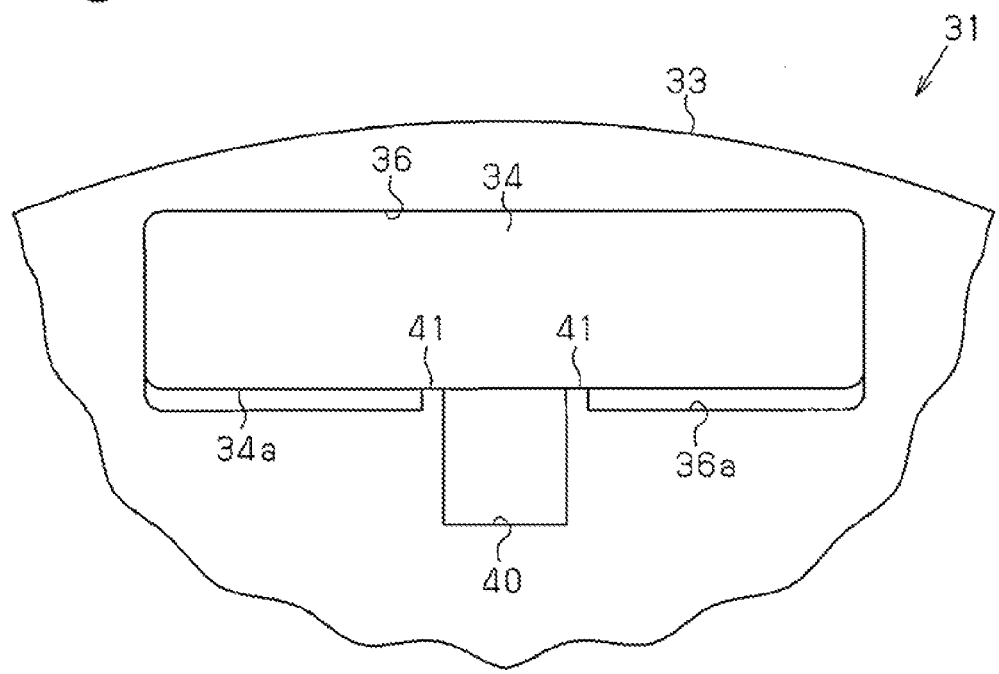
FIG. 18 is an enlarged partial view showing a rotor according to another modification.

In the form shown in FIG. 17, each projection 34e is formed in the magnet 34. However, as illustrated in FIG. 18, the inner surface 34a of each magnet 34 may be formed flat and the open distal portions 41 of each recess 40 may be projected toward the corresponding magnet 34 (in a radially outward direction). In this configuration, by press-fitting the magnets 34 in the corresponding through holes 36, the inner surface 34a of each magnet 34 is allowed to plastically deform the open distal portions 41 such that the inner surface 34a and each open distal portion 41 are pressed against each other. The configuration thus ensures the same advantages as the advantages of the form illustrated in FIG. 17.

Second Embodiment

In a second embodiment, a fixing portion of each magnet 34 is configured differently from the first embodiment. The same or like reference numerals are given to components of the second embodiment that are the same as or like corresponding components of the first embodiment.

Figure 19:
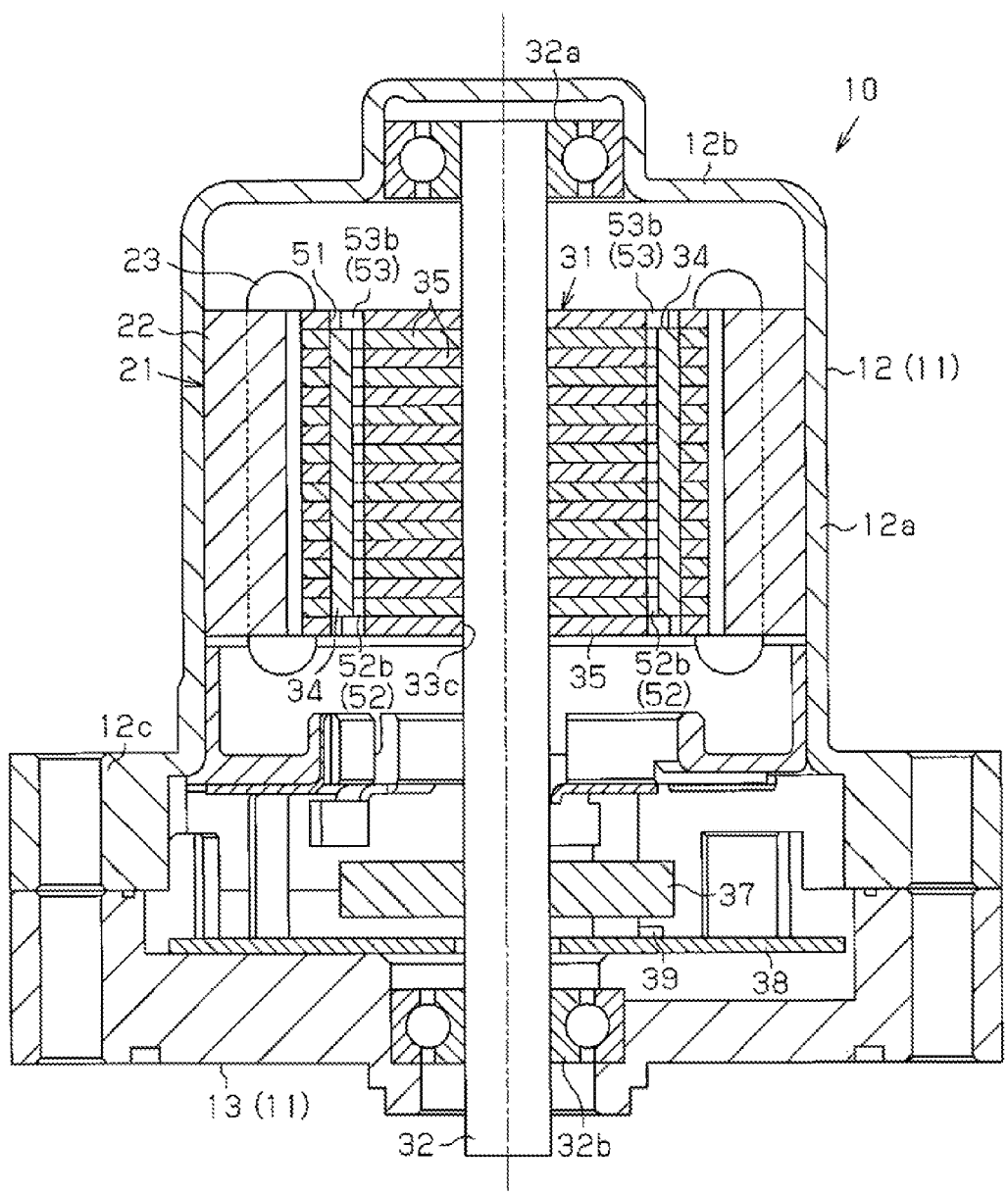
FIG. 19 is a cross-sectional view showing a motor according to a second embodiment of the invention.
Figure 20:
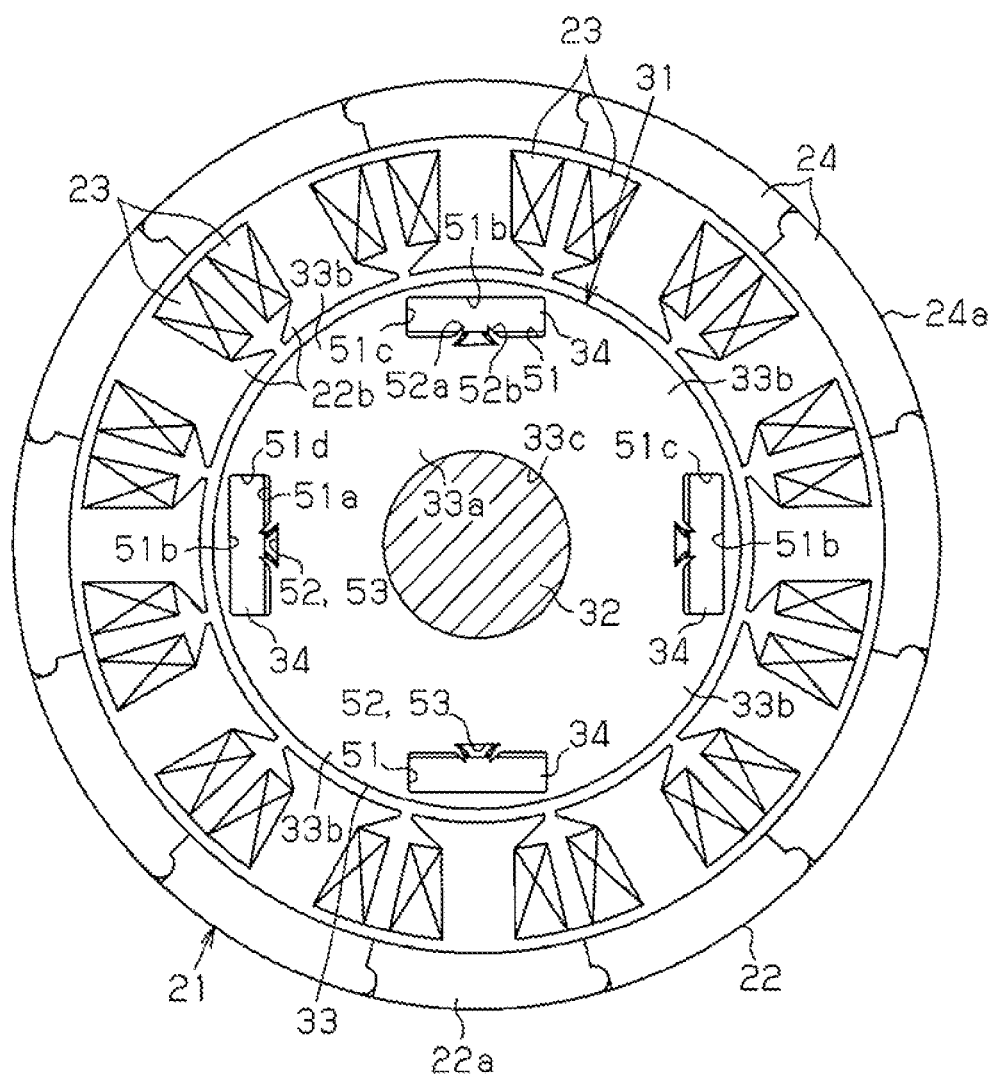
FIG. 20 is a plan view showing the rotor and the stator illustrated in FIG. 19.

As illustrated in FIGS. 19 and 20, the outer peripheral surface of the fixing portion 33a of the rotor core 33 has through holes 51, each of which axially extends through the rotor core 33 at a position between the corresponding adjacent pair of the pseudo magnetic poles 33b. Each of the through holes 51 receives the corresponding one of the magnets 34. Each magnet 34 is shaped like a rectangular parallelepiped that is elongated in the axial direction of the rotor core 33. The axial length of each magnet 34 is slightly smaller than the axial length of the rotor core 33. Specifically, each magnet 34 is axially shorter than the rotor core 33 by the margin corresponding to the two pairs of the core sheets 35 located at the opposite axial ends.

Figure 21:
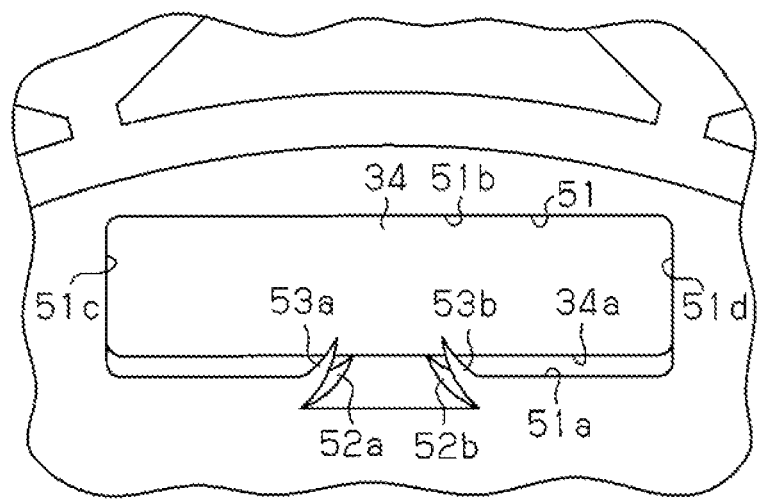
FIGS. 21 and 22 are enlarged partial views each showing the rotor illustrated in FIG. 20.
Figure 22:
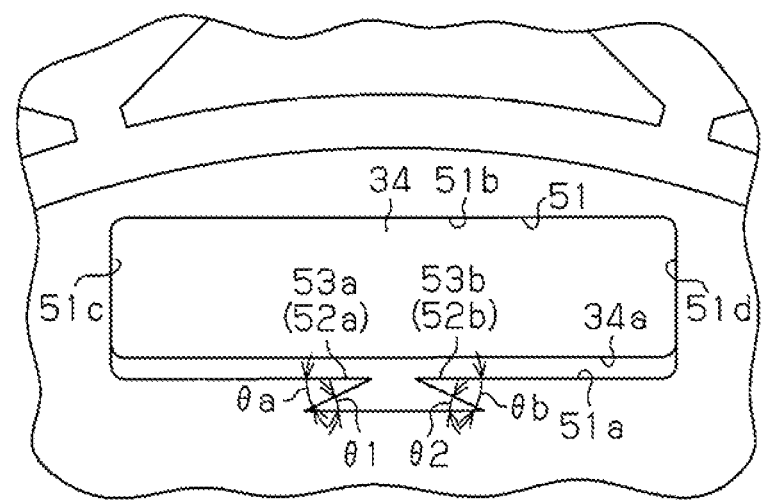

With reference to FIGS. 19 to 21, each magnet 34 is received in the corresponding through hole 51 and, in this state, maintained in a pressed manner. Specifically, in a frame portion (the through hole 51) of each of the core sheets 35 having the through holes 51, a recess 52 is formed in a manner dented radially inward. Each of the recesses 52 includes a deformation piece 52a and a deformation piece 52b. Referring to FIG. 27A, a punch 70 (a jig) has a tapered portion 70a having a width decreasing toward the center of the rotor core 33. The punch 70 is inserted into each recess 52 to plastically deform the deformation pieces 52a, 52b radially outward by means of the tapered portion 70a. This maintains the corresponding magnet 34 in a pressed manner. With reference to FIG. 22, each recess 52 is formed such that the angles θa, θb formed between a wall surface 51a, which forms the plastically deformable deformation pieces 52a, 52b, and the recess 52 are both less than 90 degrees.

The two pairs of the core sheets 35 at the opposite axial ends have recesses 53, each of which includes a deformation piece 53a and a deformation piece 53b. The plastic deformation amount of each of the deformation pieces 53a, 53b is sufficiently great for the deformation pieces 53a, 53b to be overlapped with the corresponding magnets 34 as viewed axially. As a result, the deformation pieces 53a, 53b of each recess 53, which is formed in the two pairs of the core sheets 35 arranged at the opposite axial ends, retain the corresponding magnet 34 in the axial direction.

A method for fixing (maintaining) the magnets 34 using the deformation pieces 52a, 52b, 53a, 53b of the recesses 52, 53 will hereafter be described.

The shape of each recess 52 and the shape of each recess 53 before plastic deformation (fixation of each magnet 34) will now be described. As shown in FIG. 22, the recess 52 and the recess 53 are dented radially inward and include the pair of deformation pieces 52a, 52b and the pair of deformation pieces 53a, 53b, respectively. The deformation pieces 52a, 52b, 53a, 53b are flush with the wall surface 51a of the associated through hole 51, which is located on the radially inner side in the through hole 51. The lengths the deformation pieces 52a, 52b, 53a, 53b are substantially equal. The deformation pieces 52a, 52b, 53a, 53b define substantially equal angles θ1, θ2 with respect to the radially inner wall surfaces of the associated recesses 52, 53.

With each magnet 34 inserted in the corresponding through hole 51 in the rotor core 33, for example, walls of the recess 52 formed in the corresponding wall of the through hole 51 are plastically deformed toward the magnet 34 (the stator 21). This causes the deformation pieces 52a, 52b to press the inner surface 34a of the magnet 34, thus holding and maintaining the magnet 34 between a wall surface 51b of the through hole 51, which is located on the radially outer side in the through hole 51, and the deformation pieces 52a, 52b.

Then, the deformation pieces 53a, 53b of the recesses 53 formed in the core sheets 35 at the opposite axial ends of the rotor core 33 are plastically deformed toward the stator 21 to positions where the deformation pieces 53a, 53b are overlapped with the corresponding magnet 34 as viewed axially. As a result, even if the magnet 34 is to displace axially, such displacement of the magnet 34 is restricted by the deformation pieces 53a, 53b.

The advantages of the second embodiment will hereafter be described.

(10) The wall surface 51a of each through hole 51 has the recesses 52, 53, each of which has an opening in the wall surface 51a (51b) and has the corresponding deformation pieces 52a, 52b, 53a, 53b. The deformation pieces 52a, 52b, 53a, 53b are plastically deformed at the associated openings in directions toward the corresponding magnet 34. The deformation pieces 52a, 52b of the recess 52 thus press and hold the inner surface 34a of the magnet 34. This makes it unnecessary to form a thin portion, thus facilitating holding the magnet 34 in the through hole 51.

Since the deformation pieces 52a, 52b are plastically deformed and thus pressed against the corresponding magnet 34, the deformation pieces 52a, 52b are prevented from being easily displaced in the opposite direction to the direction in which the deformation pieces 52a, 52b press the magnet 34. This stabilizes the holding force of each deformation piece 52a, 52b, thus stopping the magnet 34 from displacing axially when, for example, the rotor 31 vibrates. Further, when the deformation pieces 52a, 52b are plastically deformed to press the magnet 34, the deformation pieces 52a, 52b are allowed to escape into the recess 52. As a result, even if there are dimension errors in the magnet 34 and the through hole 51, for example, and thus the amount of plastic deformation of each deformation piece 52a, 52b toward the magnet 34 is excessive, pressure applied from the deformation pieces 52a, 52b to the magnet 34 is prevented from increasing excessively. As a result, damage to the magnet 34 caused by pressing from the side corresponding to the rotor core 33 is avoided.

(11) The recesses 52, 53 are formed such that the angle θa, θb between the wall surface 51a, which forms the plastically deformable deformation pieces 52a, 52b, 53a, 53b, and each recess 52, 53 becomes less than 90 degrees. This further facilitates plastic deformation and projection of the deformation pieces 52a, 52b, 53a, 53b toward the corresponding magnet 34.

(12) Each recess 53 is formed such that the corresponding magnet 34 and each deformation piece 53a, 53b are overlapped with each other as viewed axially. This allows the deformation pieces 53a, 53b of the recess 53 to retain the magnet 34 in the axial direction.

(13) Each recess 52 is configured such that the deformation pieces 52a, 52b are plastically deformed toward the corresponding magnet 34 to cause contact between the inner surface 34a of the magnet 34 and each deformation piece 52a, 52b. As a result, the magnet 34 is maintained (fixed) in the corresponding through hole 51 in the rotor core 33.

(14) The recesses 52, 53 are formed at the circumferentially middle position in the wall surface 51a of the corresponding through hole 51, which is located opposite to (radially inward of) the stator 21. As a result, the magnet 34 is maintained further stably by the deformation pieces 52a, 52b, 53a, 53b, which are formed at the circumferentially middle positions in the recesses 52, 53. Also, this configuration prevents increase of magnetic resistance caused by the recesses 52, 53.

(15) The identical recesses 52, 53 are formed in the frame portions of the core sheets 35 configuring the through holes 51. As a result, only a single type of core sheets is employed and the number of the types of components is prevented from increasing.

(16) Each pair of deformation pieces 52a, 52b are arranged at the opposite circumferential ends and face each other. As a result, magnetic flux produced by each magnet 34 flows from the radially inner surface of the magnet 34 to the opposite circumferential ends. This prevents increase of magnetic resistance.

The second embodiment may be modified to the forms described below.

Figure 23:
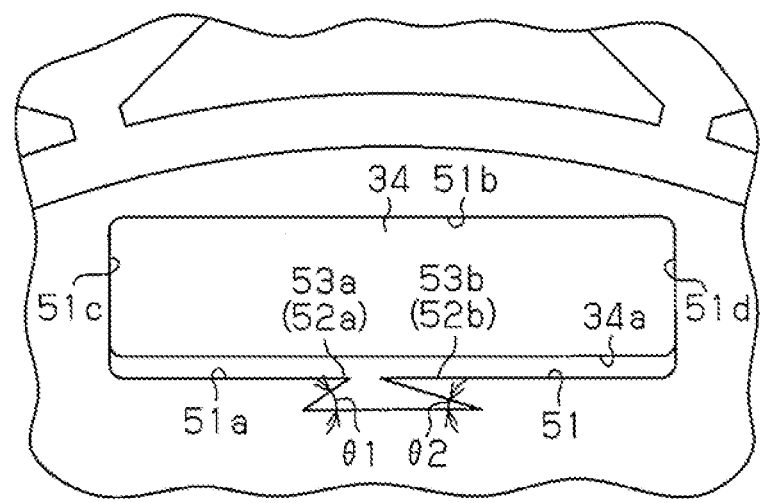
FIGS. 23, 24, 25, and 26 are enlarged partial views each showing a rotor according to a modification.

In the second embodiment, the two deformation pieces 52a, 52b, 53a, 53b of each recess 52, 53 define substantially equal angles θ1, θ2 with respect to the radially inner wall surface of the recess 52, 53 and are thus bilaterally symmetrical and have substantially identical shapes. However, the invention is not restricted to this. For example, as illustrated in FIG. 23, the deformation pieces 52a, 52b, 53a, 53b may define different angles θ1, θ2 with respect to the radially inner wall surface of the corresponding recess 52, 53 and thus be bilaterally non-symmetrical, or have different shapes. In FIG. 23, since the angle θ2 is smaller than the angle θ1, the length of each corresponding deformation piece 52b, 53b is greater than the length of each deformation piece 52a, 53a. That is, by varying the lengths of the two deformation pieces 52a, 52b, 53a, 53b of each recess 52, 53, the length of one of the deformation pieces is extremely increased. As a result, even when the magnet 34 received in the through hole 51 is small in size, the corresponding deformation pieces 52b, 53b press and hold the magnet 34.

Figure 24:
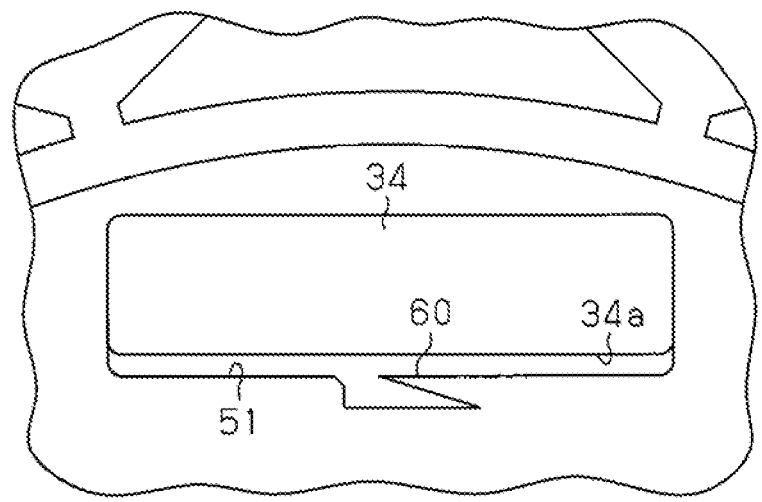

In the second embodiment, each of the recesses 52, 53 has the two deformation pieces 52a, 52b, 53a, 53b. However, the invention is not restricted to this. That is, as illustrated in FIG. 24, each recess 52, 53 may include a single deformation piece 60.

Figure 25:
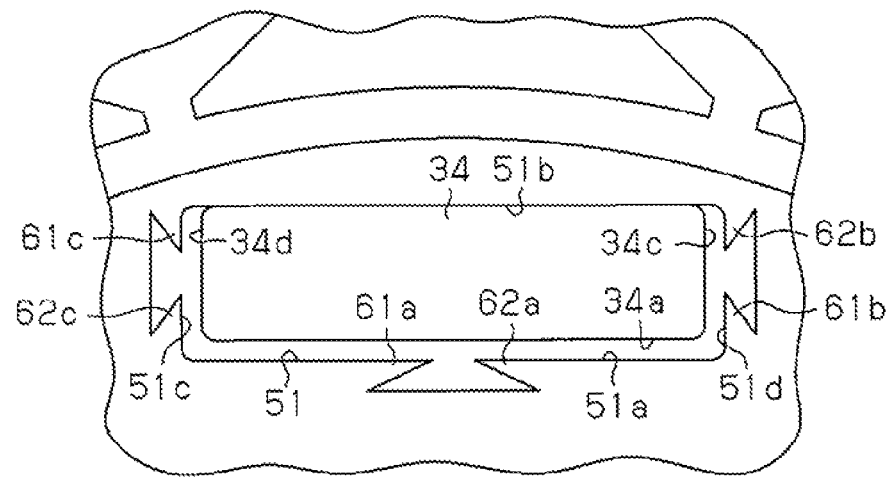

In the second embodiment, the recesses 52, 53 are formed only at the circumferentially middle position in the wall surface 51a of each through hole 51, which is located opposite to (radially inward of) the stator 21. However, the locations and the number of the recesses 52, 53 may be changed as needed. For example, with reference to FIG. 25, a recess having two deformation pieces 61a, 62a may be formed at the circumferentially middle position in the wall surface 51a of each through hole 51, which is located opposite to (radially inward of) the stator 21. Additionally, a recess having two deformation pieces 61b, 62b and a recess including two deformation pieces 61c, 62c may be formed in a wall surface 51d of the through hole 51 at a first circumferential end and in a wall surface 51c at a second circumferential end, respectively. The two deformation pieces 61a, 62a at the circumferentially middle position press the inner surface 34a of the corresponding magnet 34. The deformation pieces 61b, 62b at the first circumferential end press the first circumferential end portion 34c of the magnet 34 and the deformation pieces 61c, 62c at the second circumferential end press a second circumferential end portion 34d of the magnet 34. In this manner, the magnet 34 is pressed by the deformation pieces 61a, 62a, 61b, 62b, 61c, 62c formed in the multiple recesses. The magnet 34 is thus maintained with improved reliability.

Figure 26:
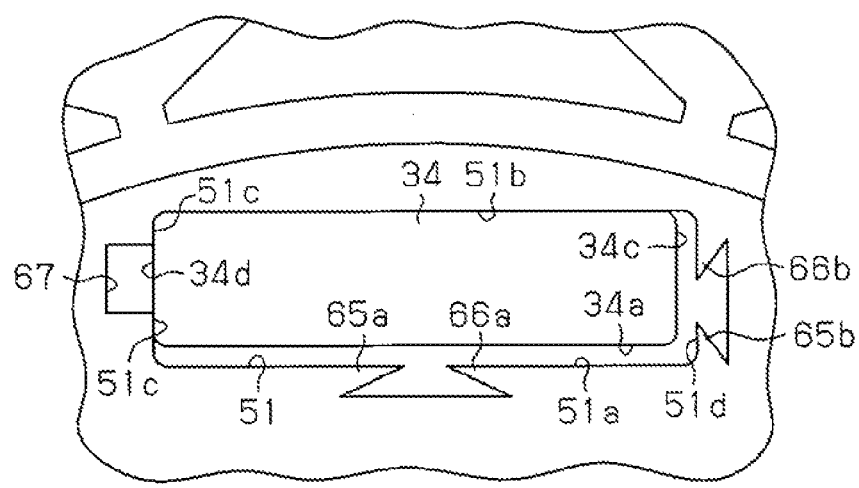
Figure 26:
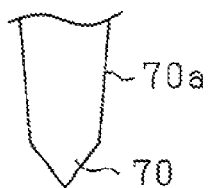
Figure 26:
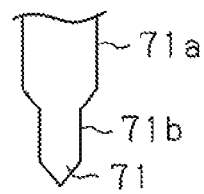
Figure 26:
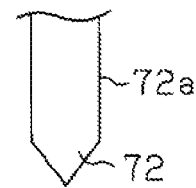

As shown in FIG. 26, a recess having two deformation pieces 65a, 66a may be formed at the circumferentially middle position in the wall surface 51a of each through hole 51 located opposite to (radially inward of) the stator 21. Additionally, a recess having two deformation pieces 65b, 66b may be arranged in the wall surface 51d at the first circumferential end. In this configuration, each magnet 34 is pressed in two directions to contact a first side (the wall surface 51c) of the corresponding through hole 51. Specifically, the magnet 34 is held in surface contact with the wall surface 51b at the side corresponding to the stator 21 and the wall surface 51c at the second circumferential end. In this state, the deformation pieces 65a, 65b, 66a, 66b press the magnet 34 in two directions, thus maintaining the magnet 34 with improved stability. In this case, the wall surface 51c may include a gap forming recess 67, which is dented outward from the wall surface 51c in a circumferential direction. The gap forming recess 67 brings about a non-contact state between a radially middle portion of the corresponding circumferential end of the magnet 34 and the corresponding wall of the through hole. As a result, when the deformation pieces 65a, 66a, 65b, 66b of the recesses are plastically deformed in respective directions to press the magnet 34, the magnet 34 is held by the wall portions of the wall surface 51c at the opposite sides of the gap forming recess 67 at two points at a second circumferential end. This prevents displacement of the magnet 34.

In this case, it is preferable to form the recess having the deformation pieces 65b, 66b, which is arranged in the wall surface 51d at one circumferential end, at a position spaced from (located radially inward of) the stator 21 compared to the radially middle position in the magnet 34. In this configuration, the deformation pieces 65b, 66b of the recess in the wall surface 51d at a first circumferential end press the magnet 34 in a direction toward the second circumferential end of the through hole 51 (the wall surface 51c) and in a direction toward the stator 21 (a radially outward direction).

As a result, the magnet 34 is pressed toward the second circumferential end (against the wall surface 51c) and toward the stator 21 (in a radially outward direction) with enhanced reliability.

In the second embodiment, the punch 70 includes the tapered portion 70a, which has a tapered shape. However, instead of the punch 70, a punch 71 (see FIG. 27B) having two linear portions 71a, 71b forming a step may be used to plastically deform the recesses 52, 53 simultaneously. Alternatively, a punch 72 (see FIG. 27C) having a single linear portion 72a may be employed to plastically deform the only one of the recesses 52, 53.

The first and second embodiments may be modified to the forms described below.

In the first and second embodiments, the accommodating hole accommodating each magnet 34 is configured as the through hole 36, 51, which axially extends through the rotor core 33. However, the accommodation hole may be, for example, a hole having one closed end in the axial direction of the rotor core 33.

In the first and second embodiments, the rotor core 33 is formed by laminating the multiple core sheets 35. However, the invention is not restricted to this. That is, the rotor core 33 may be formed as an integral body through, for example, forging.

In the first and second embodiments, the rotor 31 is a consequent pole type. However, the invention is not restricted to this and may be employed in a rotor in which magnets having different magnetic poles are arranged alternately in the circumferential direction. Specifically, any suitable rotor may be used as long as the rotor is an IPM type, or has magnets embedded in the rotor core 33.

The technical ideas obtainable from the above embodiments other than those disclosed in the claim section are described below with their advantages.

(a) A rotor comprising a rotor core formed by laminating core sheets each having a through hole and a magnet received in the through hole of the rotor core, the rotor being opposed to a stator in a radial direction, wherein a wall surface of the through hole includes a recess having an opening in the wall surface, and at least one deformation piece, the deformation piece being plastically deformed toward the magnet at an end of the recess at the side corresponding to the opening.

In this configuration, the wall surface of the through hole has the recess having the opening in the wall surface and at least one deformation piece, which is plastically deformed toward the magnet at the end of the recess at the side corresponding to the opening. The magnet is thus pressed and held by the deformation piece in the recess. Since the deformation piece is plastically deformed to press the magnet, the deformation piece cannot be easily displaced in the opposite direction to the direction in which the deformation piece presses the magnet. This stabilizes the holding force of the deformation piece, thus preventing the magnet from axially displacing when, for example, the rotor vibrates. Also, when the deformation piece is plastically deformed to press the magnet, the deformation piece is allowed to escape into the recess. Accordingly, even if there is a dimension error in the magnet or the through hole and thus the amount of plastic deformation of the deformation piece toward the magnet becomes excessive, pressure applied from the deformation piece to the magnet is prevented from becoming excessive. As a result, damage to the magnet caused by pressing from the side corresponding to the rotor core is avoided.

Conventional techniques employ a fixing method for deforming a thin portion using a pin, which is press-fitted and fixed in a rotor core, to press the thin portion against a magnet. However, the thin portion is difficult to form accurately. Also, when the rotor core is (the core sheets are) molded through pressing, a support portion of a table for supporting the thin portion must be thin in correspondence with the thin portion. This may shorten life of the press die disadvantageously. However, the configuration described in idea (a) makes it unnecessary to form the thin portion unlike the conventional techniques, thus facilitating maintenance of the magnet in the through hole.

(b) The rotor according to idea (a), wherein the angle between the recess and the wall surface of the through hole in which the deformation piece is formed is less than 90 degrees.

In this configuration, since the angle between the recess and the wall surface of the through hole in which the deformation piece is formed is less than 90 degrees, the deformation piece is reliably plastically deformed toward the magnet.

(c) The rotor according to idea (a) or (b), wherein the deformation piece in the recess is plastically deformed toward the magnet such that the magnet and the deformation piece are overlapped with each other as viewed axially.

In this configuration, the deformation piece in the recess is plastically deformed toward the magnet and the magnet and the deformation piece are overlapped with each other as viewed axially. This configuration restricts axial movement of the magnet, thus preventing the magnet from separating from the through hole.

(d) The rotor according to idea (a) or (b), wherein the deformation piece in the recess is plastically deformed toward the magnet such that a side surface of the magnet and the deformation piece contact each other.

In this configuration, since the deformation piece in the recess is plastically deformed toward the magnet to bring the side surface of the magnet and the deformation piece into contact with each other, the magnet is maintained (fixed) in the through hole in the rotor core.

Also, a first recess having a deformation piece overlapped with the magnet as viewed axially may be formed in addition to a second recess for pressing and holding the magnet in the through hole. As a result, the deformation piece in the first recess retains the magnet in the axial direction.

(e) The rotor according to any one of ideas (a) to (d), wherein the recess includes two deformation pieces, and the deformation pieces have different lengths.

In this configuration, the lengths of the two deformation pieces in the recess are varied such that, for example, one of the deformation pieces has an extremely great length. As a result, even if the magnet inserted in the through hole is small-sized, the magnet can be pressed and held by the long one of the deformation pieces.

(f) The rotor according to any one of ideas (a) to (e), wherein the recess is formed at a circumferentially middle position in the wall surface of the through hole spaced from the stator.

In this configuration, the recess is formed at the circumferentially middle position in the wall surface of the through hole spaced from the stator. The magnet is thus held with improved stability compared to a case in which a recess (a deformation piece) formed at a circumferentially middle position in the inner peripheral surface maintains the magnet. Also, magnetic resistance caused by the recess is prevented from increasing.

(g) The rotor according to any one of ideas (a) to (e), wherein the recess is one of recesses that are formed in a wall surface of the through hole spaced from the stator and inner wall surfaces of the through hole at opposite circumferential ends.

In this configuration, the recesses are formed in the wall surface of the through hole spaced from the stator and the wall surfaces of the through hole at the opposite circumferential ends. The magnet is thus pressed by multiple deformation pieces formed in the corresponding recesses. This improves reliability for maintaining the magnet.

(h) The rotor according to any one of ideas (a) to (e), wherein the recess is one of recesses that are formed in a wall surface of the through hole spaced from the stator and a wall surface of the through hole at one circumferential end.

In this configuration, the recesses are formed in the wall surface of the through hole spaced from the stator and the wall surface of the through hole at a first circumferential end. The magnet is thus pressed in two directions to contact one side in the through hole. Accordingly, the magnet is held in surface contact with a wall surface close to the stator and a wall surface at a second circumferential end and, in this state, pressed by the deformation pieces in the two directions. As a result, the magnet is maintained with increased stability. Also, by bringing the magnet close to the first circumferential end, the position at which magnetic flux generates is stabilized.

(i) The rotor according to idea (h), wherein the recess formed in the wall surface of the through hole at the first circumferential end is arranged at a position offset from a radially middle position in the magnet in a direction separating from the stator.

In this configuration, the recess formed in the wall surface of the through hole at the first circumferential end is located at the position offset from the radially middle position in the magnet in the direction separating from the stator. As a result, a deformation piece formed in the recess formed in the wall surface at a first circumferential end presses the magnet in a direction toward the second circumferential end of the through hole and a direction toward the stator. This improves reliability for pressing the magnet toward the second circumferential end and the stator.

(j) A motor having the rotor according to any one of claims 1 to 10 and ideas (a) to (i).

In this configuration, a motor having the same advantages as the advantages of any one of ideas (a) to (i) is provided.

The invention claimed is:

1. A rotor comprising a rotor core arranged to radially face a stator, the rotor core having an accommodation hole extending axially from an axial end face of the rotor core, a magnet being received in the accommodation hole, wherein a recess dented in a direction extending away from the magnet is formed in a wall surface of the accommodation hole at an axial end of the accommodation hole, the recess configured to receive a staking jig, and having an opening that faces the magnet, the opening defined by a pair of opposing circumferential end walls forming a pair of open distal portions, each of the open distal portions is plastically deformed to be pressed against the magnet, the plastic deformation of the open distal portions caused by insertion of the staking jig into the recess, and a staking mark is formed in the radially middle portion of the recess as a result of the pressing of the staking jig against the circumferential opposing end walls in an axial direction, and the staking mark intersects the recess as viewed axially, extending beyond a circumferential width of the recess.

2. The rotor according to claim 1, wherein a depth of the recess in a pressing direction in which the magnet is pressed by the open distal portions is greater than a clearance in the pressing direction between the accommodation hole and the magnet.

3. The rotor according to claim 1, wherein the wall surface of the accommodation hole is one of a pair of radially opposing radial end wall surfaces, and wherein the recess is formed in the radial end wall surface more spaced from the stator than the other radial end wall surface.

4. The rotor according to claim 3, wherein the recess is formed in a circumferentially middle portion of the radial end wall surface.

5. The rotor according to claim 1, wherein the recess is one of recesses formed in the radial end wall surfaces and a circumferential end wall surface of the accommodation hole.

6. The rotor according to claim 1, wherein the rotor core is formed by axially laminating a plurality of core sheets, two sets of the core sheets located at opposite ends in a laminating direction of the core sheets are first core sheets each forming the accommodation hole and the recess, each of the sets including a predetermined number of core sheets, and those of the core sheets arranged between the sets of the first core sheets are second core sheets each forming the accommodation hole but not including the recess.

7. The rotor according to claim 1, wherein the rotor core is formed by axially laminating a plurality of core sheets, two sets of the core sheets located at opposite ends in a laminating direction of the core sheets are first core sheets, each of the sets including a predetermined number of core sheets, two sets of the core sheets located adjacent to the first core sheets at an inner side in the laminating direction of the core sheets are second core sheets, each of the sets including a predetermined number of core sheets, and the open distal portions of the recess formed in the second core sheets are pressed against the magnet.

8. The rotor according to claim 7, wherein the open distal portions of the recess corresponding to those of the first core sheets at opposite ends in the laminating direction are plastically deformed to project into the accommodation hole and contact the magnet in the axial direction of the rotor core.

9. The rotor according to claim 7, wherein those of the core sheets at the opposite ends in the laminating direction have a jig insertion window for receiving a jig for plastically deforming those of the core sheets arranged at the inner side in the laminating direction.

10. The rotor according to claim 1, wherein the rotor core is formed by axially laminating a plurality of core sheets having identical shapes.

11. The rotor according to claim 1, wherein
the recess is defined by a pair of opposing end wall portions extending continuously from the wall surface of the accommodation hole, and
an angle between each of the end wall portions and the wall surface of the accommodation hole is substantially 90 degrees or less than 90 degrees.

* * * * *